(12) United States Patent
Barlow et al.

(10) Patent No.: US 6,275,935 B1
(45) Date of Patent: Aug. 14, 2001

(54) SYSTEMS AND METHODS FOR LOCKING INTERACTIVE OBJECTS

(75) Inventors: Steven Barlow, Newton; Eldridge Leaphart, Jr., Lexington; Guntis V. Strazds, West Newton; Curtis Rudbart, Cambridge, all of MA (US)

(73) Assignee: Thingworld.com, LLC, Newton, MA (US)

( * ) Notice: Subject to any disclaimer, the term of this patent is extended or adjusted under 35 U.S.C. 154(b) by 0 days.

(21) Appl. No.: 09/062,061

(22) Filed: Apr. 17, 1998

(51) Int. Cl.[7] ........................................................ G06F 1/24
(52) U.S. Cl. ............................. 713/182; 713/155; 713/168
(58) Field of Search .................................... 380/255, 258; 713/151, 155, 156, 161, 168, 169, 193, 182

(56) References Cited

U.S. PATENT DOCUMENTS

| | | | |
|---|---|---|---|
| 5,060,144 | * 10/1991 | Sipple et al. | 710/200 |
| 5,193,162 | * 3/1993 | Bordsen et al. | 711/152 |
| 5,301,337 | * 4/1994 | Wells et al. | 709/104 |
| 5,319,780 | * 6/1994 | Catino et al. | 707/8 |
| 5,636,292 | 6/1997 | Rhoads | 382/232 |

OTHER PUBLICATIONS

Cryptolope Technology, "Network computing", http://www.cryptolope.ibm.com, IBM Corporation, Sep. 16, 1997, 6 pages.

Digital Arts & Sciences, "Managing The World's Visual Informaton", http://www.digital–collections.com, Oct. 1, 1997, 2 pages.

"Font Embedding and Copyright Issues", http://www.bitstream.com/w3/W3CEMBED.HTM, Sep 16, 1997, 2 pages.

"Frequently Asked Questions about Digimarc Watermark Technology," Digimarc Corporation, http://www.digimarc.com/faq_page.html, Aug. 20, 1997, 2 pages.

"Frequently Asked Questions: General Questions", Digimarc Corporation, http://www.digimarc.com/faq1.html, Aug. 20, 1997, 1 page.

"Frequently Asked Questions: Digimarc Capabilities", Digimarc Corporation, http://www.digimarc.com/faq2.html, Aug. 20, 1997, 5 pages.

"Frequently Asked Questions: Digimarc Operation", Digimarc Corporation, http://www.digimarc.com/faq3.html, Aug. 20, 1997, 6 pages.

"Frequently Asked Questions: Digimarc On–Line Service", Digimarc Corporation, http://www.digimarc.com/faq4.html, Aug. 20, 1997, 3 pages.

"Frequently Asked Questions: Technical Terms and Concepts", Digimarc Corporation, http://www.digimarc.com/faq5.html, Aug. 20, 1997, 3 pages.

"Frequently Asked Questions: Related Technologys", Digimarc Corporation, http://wwww.digimarc.com/faq6.html, Aug. 20, 1997, 3 pages.

"Frequently Asked Questions: Digimarc Specific Technical Questions", Digimarc Corporation, http://www.digimarc.com/faq7.html, Aug. 20, 1997, 2 pages.

\* cited by examiner

*Primary Examiner*—Thomas R. Peeso
(74) *Attorney, Agent, or Firm*—Testa, Hurwitz & Thibeault, LLP

(57) ABSTRACT

An object locking system for preventing unauthorized modification of interactive objects having one or more object states. An object designer interactively assigns one or more object behaviors to each object state. An end user of the object displays the object behavior associated with an object state, typically by invoking the object state with an input device. A lock behavior provides a way of locking an object behavior or aspect of an object. The object designer sets which aspects of an object are to be locked, and a lock controller prevents active access to those aspects accordingly. In addition, an object can be locked based on a password or based on the location of display of the object.

12 Claims, 23 Drawing Sheets

SYSTEMS AND METHODS FOR LOCKING INTERACTIVE OBJECTS

CROSS REFERENCES TO RELATED APPLICATIONS

This application incorporates by reference the teachings of "Systems and Methods for Creating Interactive Objects", filed concurrently with this application and "Systems and Methods for Providing Attribution for Interaction Objects" filed concurrently with this application.

FIELD OF THE INVENTION

The invention relates to systems and methods for creating objects for use on a computer system, and, more particularly, to object creation systems that produce objects for display and manipulation by an end user of the computer system.

BACKGROUND OF THE INVENTION

Computer systems have long executed software programs that are presented to an end user to provide input or otherwise manipulate the program. Some programs are represented by icons on a display screen that an end user can select or otherwise invoke to produce a result or behavior, such as producing a sound, displaying a graphic image, or displaying a software application menu. For example, an end user can select an icon of a spreadsheet file to activate a software spreadsheet application. Typically, such behaviors are programmed into the software program using the computer language of the program. A programmer is usually the creator of the icon and associated behavior for the end user.

An icon can also be modified after it has been created. This is often done by a technical support person, such as a system administrator, rather than by the end user of the computer system. The system administrator can make a limited or specific change in the behavior associated with a displayed icon by using menus and data entry fields, such as changing the icon that is associated with a given program, but the procedures for doing this are typically cumbersome. When these changes are made, the technical support person is focused on a specific issue, such as changing the icon displayed for a program, rather than viewing the icon and its related program as a whole object.

More recently, object systems such as HTML, CGI scripts, Java programs, and Java Beans (objects) provide displayed text or objects that have behaviors programmed into them. The software programmer is, in effect, an object designer who creates and modifies the objects seen by the end user. The end users select different objects, such as ones with different HTML links, to get different behaviors, such as moving to a different object or text display based on the HTML link. Typically, an object designer must be a software engineer in order to create and change complicated objects. One problem is that changes may be made by programmers without authorization from the originators and/or owners of the displayed text or object.

Therefore, an objective of the invention is to provide a locking mechanism to prevent unauthorized individuals from changing locked aspects of an object.

SUMMARY OF THE INVENTION

The invention achieves the above objective by providing systems and methods for locking interactive objects and preventing unauthorized users from modifying them.

In one embodiment of the invention, the invention is understood as an apparatus for locking an aspect of an object. The apparatus includes a processor, a lock controller, and a memory in communication with the processor. The memory includes an aspect data structure associated with the aspect of an object, a lock data structure associated with the object, and an object data structure. The object data structure includes an aspect pointer linking the aspect data structure to the object data structure and a lock pointer linking the lock data structure to the object data structure. The lock controller prevents active access to the aspect data structure once the lock data structure is created.

In another embodiment, the memory further includes an identification data structure including lock owner data related to the lock data structure, which includes an identification pointer from the lock data structure to the identification data structure. In a further embodiment, the identification data structure includes an encryption owner password, and the lock controller allows active access to the aspect data structure in response to a comparison of the encryption owner password with a password from the user. In a further embodiment, the identification data structure is stored in an identification registration file. In an additional embodiment, the lock data structure includes a place of play datum. The processor determines a location of display of the object, and the lock controller prevents active access to the aspect data structure if the location of display and the play of play datum are not substantially identical. In one embodiment, the aspect data structure includes aspect lock data specifying a locking level for each aspect.

In one embodiment, the invention can be understood as a method for locking an aspect of an object. The method includes creating an object data structure associated with the aspect of the object and having an aspect pointer and a lock pointer, creating a lock data structure associated with the object, and preventing active access to the aspect data structure in response to the creation of the lock data structure. The aspect pointer links the aspect data structure to the object data structure, and the lock pointer links the lock data structure to the object data structure.

In another embodiment, the method includes creating an identification data structure including lock owner data related to the lock data structure, which includes an identification pointer to the identification data structure.

In a further embodiment, the identification data structure includes an encryption owner password. The method further includes requesting a password from a user, comparing the user password to the encryption owner password, and permitting active access to the aspect data structure if the user password corresponds to the encryption owner password.

In an additional embodiment, the method further comprises determining a location of display of the object, and preventing active access to the aspect data structure if the location of display is not substantially identical to the place of play datum in the lock data structure.

BRIEF DESCRIPTIONS OF THE DRAWINGS

The invention is pointed out with particularity in the appended claims. The above and further advantages of this invention may be better understood by referring to the following description taken in conjunction with the accompanying drawings, in which:

DETAILED DESCRIPTION OF THE INVENTION

The illustrated embodiments of the invention feature systems and methods for locking objects created and used on computer systems.

Figure 1:
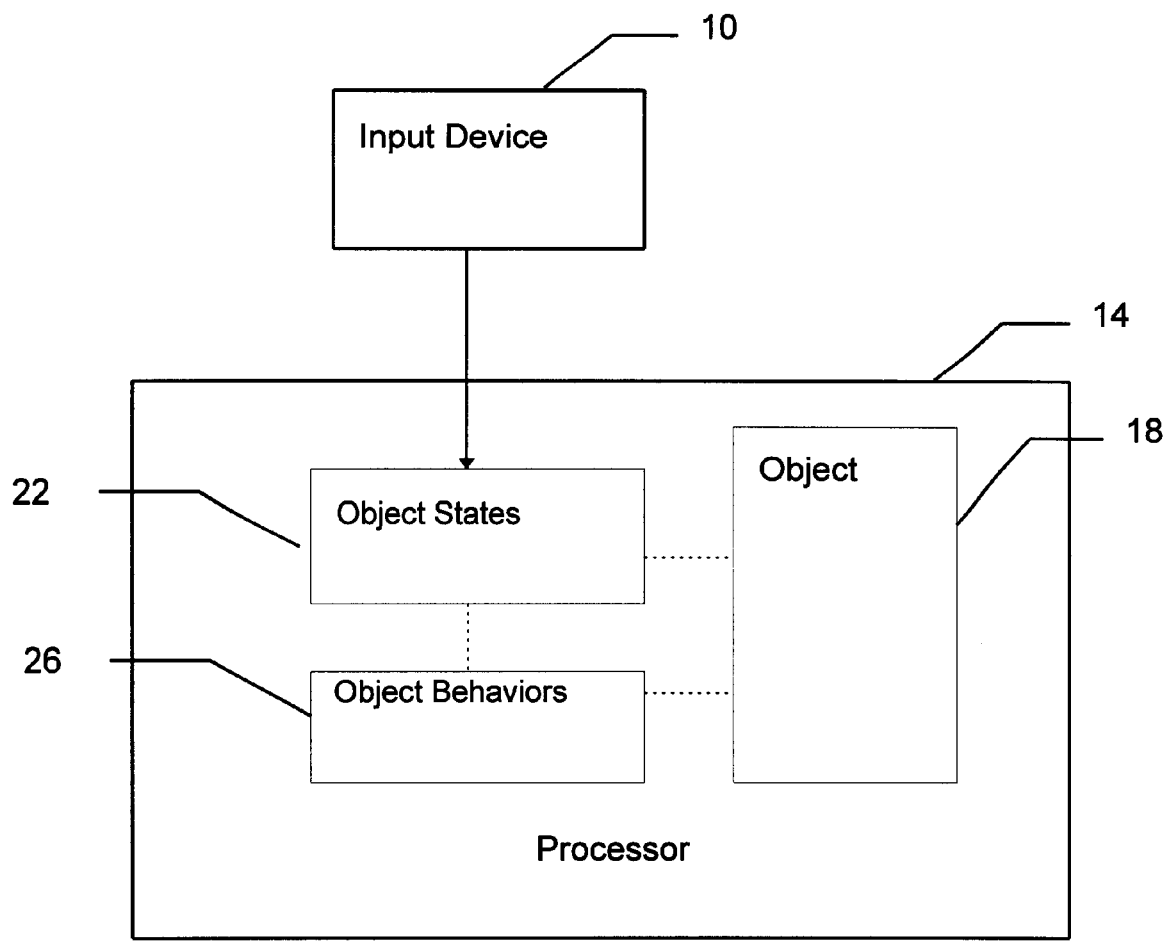
FIG. 1 is a high level functional block diagram of an embodiment of the invention.

FIG. 1 depicts an embodiment of a system of the invention that includes an input device 10, a processor 14, an object 18, object states 22, and object behaviors 26. An object designer creates the object 18 and assigns object behaviors 26 to object states 22, and then makes the object 18 available to end users of the object who invoke the object behaviors 26 by invoking the object states 22 with the input device 10. Alternatively, an end user with sufficient privilege can interactively reassign or change one or more of the object behaviors 26 assigned to one of the object states 22.

The input device 10 is a mouse device, computer keyboard, joystick, computer game controller, touch screen, or other input device commonly used with computer systems, electronic games, video games, or virtual reality systems.

The processor 14 is a digital data processor. Alternatively, the processor 14 is a hard-wired device such as an ASIC (application specific integrated circuit) or an externally programmable ROM (read only memory), such as an EEPROM (electrically erasable programmable read-only memory).

An object 18 is a software entity executing on the processor 14. An object 18 can be one executable file, or the object 18 can be implemented as part of a larger executable file containing several objects 18. In some cases, the object 18 can be implemented in several related executable files on the processor 14, but the object 18 maintains its identity as a software entity. The object 18 is a software object, which in one embodiment is based on an object oriented programming language and/or system, such as C++, Visual C++, Visual Basic, SmallTalk, Java, or Java Beans.

Object states 22 are different states that an object 18 can have as a result of interactions with other objects 18 or an end user of the objects 18. An object 18 can also have a default state, when no input or interaction has occurred. The number of object states 22 can vary depending on the object 18. Typically, different object states 22 have different object behaviors 26 associated with them. For example, an object behavior 26 can include a Web Address behavior 224 providing a link to another site on the Internet (see FIG. 6). When first displayed, the object 18 is in an inactive, default state. When the end user who is viewing the object 18 activates it using an input device 10, the Web link is activated, the connection is made to the other Web site, and, if successful, the other Web site is displayed on the display screen to the end user. An object behavior 26 can be more complex, as when an object 18 displays a video clip when activated, or moves in a predetermined path over the display screen.

An object 18 can have one or two object states 22, or a very large number of states 22 depending on the object-oriented software system and application. An object state 22 can be set by input provided by the end user using an input device 10. A complicated control device, as the control device for a video or computer game, for example, could have a different object state 22 associated with each setting of each control button on the control device. Thus, if the control device has three control buttons having a total of six settings, then an object 18 could have six object states 22. However, there is no requirement for such one-to-one correspondence between button settings and object states 22. In this example of a device with three control buttons, some of the buttons could produce a separate, additional signal when pressed simultaneously, in which case the number of object states 22 could be more than six.

An object state 22 could also change without input from outside the object 18. For example, an object 18 could change its state as a function of time without any interaction or input from a source external to the object 18. For example, an object 18 may be assigned a collision behavior that will play out if the object 18 collides with another object 18. For example, this may occur if two objects 18 are represented by images of airplanes that fly into each other and cause a collision. In this case, the object designer may include other behaviors 26 in the collision behavior that will occur if a collision occurs. For example, people may parachute out of the airplane, which then falls to the ground. In this situation, the collision behavior will play out the sequence of assigned behaviors 26 until completing all the behaviors 26 included in the collision by the object designer without any further input from the end user.

Figure 2:
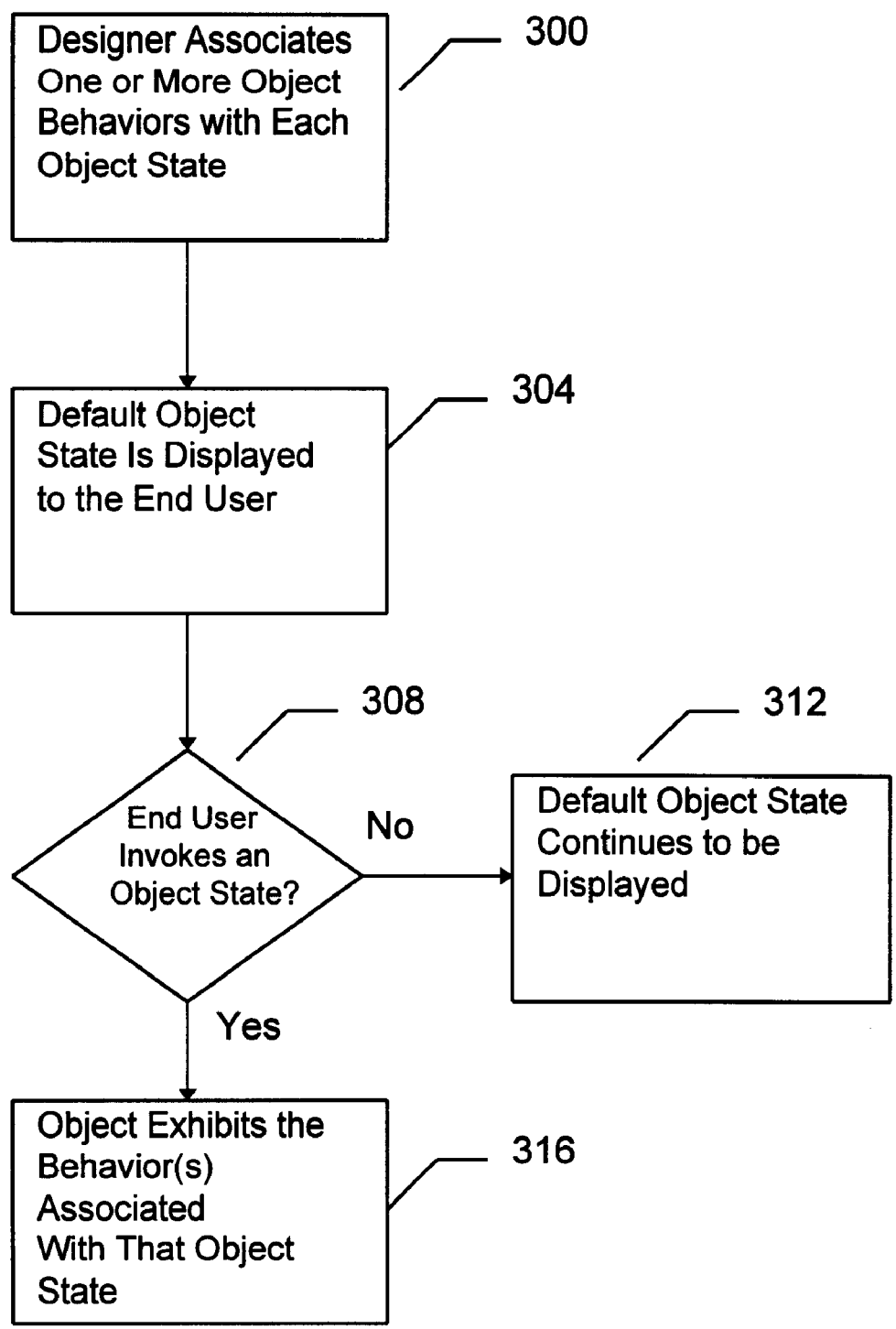
FIG. 2 is a high level flow chart of an embodiment of the object creation and viewing process for the embodiment of the invention shown in FIG. 1.

An embodiment of a process of using an object 18 and selecting an object state 22 is shown in FIG. 2. First, the object designer interactively assigns or associates one or more behaviors 26 to each object state 22 (step 300). Once the object designer has finished designing the object 18, then it can be made available to an end user. The default object state 30 (see FIG. 3) is initially displayed to the end user (step 304). In the default state 30, the object 18 has no behaviors 26 associated with it, for example, the object 18 is simply displayed on the screen, or alternatively, has behaviors 26 associated with it that occur without any action by the end user, for example, the object may alternate periodically between two colors. The end user may then choose to invoke an object state 22 or choose not to invoke it (step 308). If the end user invokes an object state 22, then the one or more behaviors 26 associated with the new state 22 are exhibited (step 316). If the end user does not invoke an object state 22, then the default object state 30 continues to be displayed (step 312).

Figure 3:
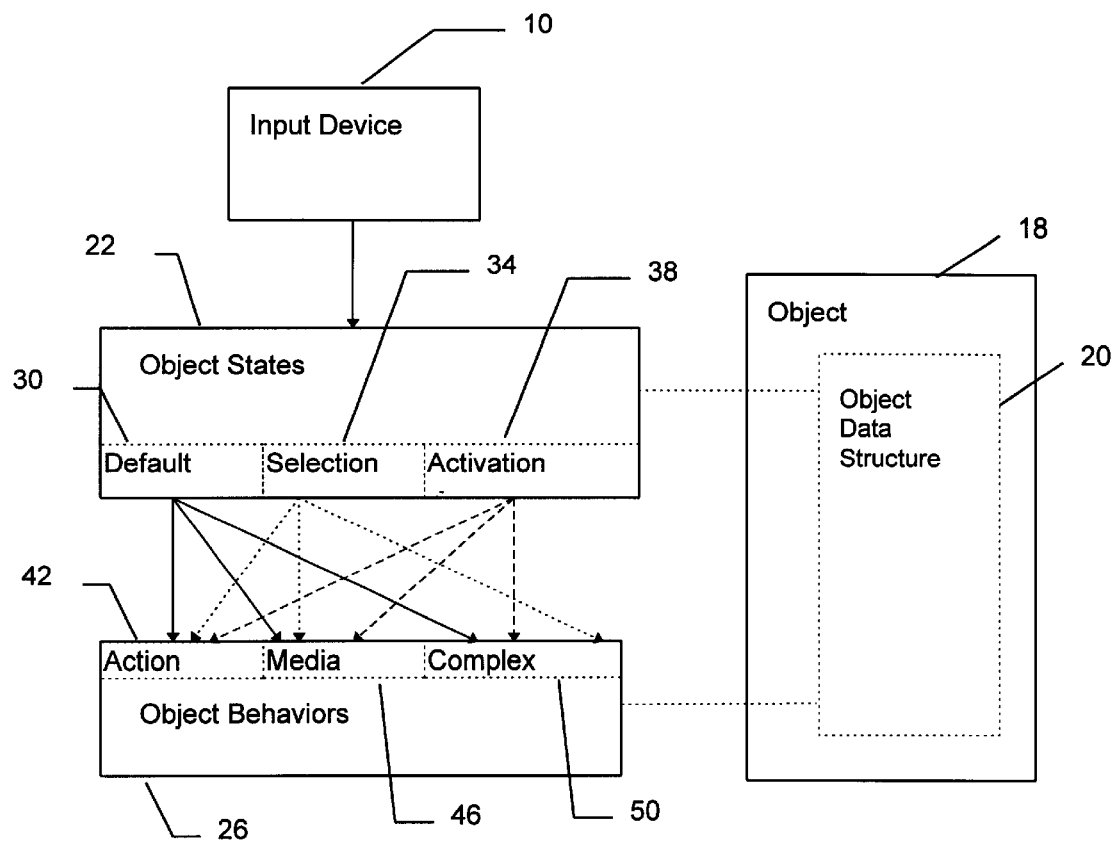
FIG. 3 is a more detailed functional block diagram of the embodiment of the invention shown in FIG. 1.

The embodiment of the invention shown in FIG. 3 shows the input device 10, object 18, object data structure 20, object states 22, and object behaviors 26. The object data structure 20 includes information about the object states 22, assigned object behaviors 26, and other information about the object 18. The object data structure 20 is discussed in more detail later.

In one embodiment, the object states 22 include default 30, selection 34, and activation 38 object states. The default state 30 is the initial or basic state that occurs by default when the user takes no action with the input device 10. The selection state 34 occurs when the user manipulates the input device 10 to select the object 18. For example, in one embodiment, the object 18 is selected when the end user places a cursor over an object 18 displayed on a computer screen. The activation state 38 occurs when the end user manipulates the input device 10 to activate the object 18. In one embodiment, the object 18 is activated when the end user clicks on a mouse button when the cursor is resting over the object 18. Alternatively, in another embodiment, the end user selects an object 18 by using a tab or arrow key to move across a computer display to the object 18 involved. The end user then activates the object 18 by pressing the return or enter key.

Referring to the embodiment shown in FIG. 3, the object behaviors 26 include action 42, media 46, and complex 50 object behaviors. In one embodiment, an action behavior 42 is a behavior that provides for some action to occur on the computer display when the object 18 is invoked, such as a jump to another site on the Web. For example, action behaviors 42 include a cursor behavior, a Web link behavior 224, an attribution behavior 400 (such as a copyright behavior), and a lock behavior 600, as are defined in more detail below (see FIGS. 11 and 18). The cursor behavior provides for moving an object 18 across a display by moving a cursor placed over the object 18. The Web link (or Web address) behavior 224 provides a Web link that takes the end user to another location on a network, such as another Web site on the Internet. The attribution behavior 400 provides attribution information on the owner and/or author of the object 18. For example, the attribution information 400 can provide a copyright notice provided by the owner of the object 18. The lock behavior provides a locking mechanism for the object 18 that prevents others from modifying the object 18 after it has been created.

In one embodiment, a media behavior 46 is a behavior based on the expression of a media, such as a visual or audio effect. Media behaviors 46 include a media element, such as a graphic image; an audio behavior, such as a sound file 74 providing a noise or a selection of sound or music (see FIG. 6); or a video behavior, such as a segment of moving images. A graphic image can be a bitmap, such as a drawing, cartoon-like character, or other image created using a software drafting, drawing, or art package. The image can also be a scanned image from a photograph.

An audio behavior can be any type of noise or musical segment, usually contained in an audio file 74. The audio behavior can be imported from a source external to the computer, such as from an audio tape or other musical recording. The audio behavior can also be generated by a designer or musician using musical and audio software on a computer system, which is then stored in an audio file 74.

A video behavior typically is based on an excerpt from a video tape, which can include any type of moving or still image that can be recorded on a video tape. A video behavior of moving images can also be based on a video or animation segment generated by a software video or animation package, which is then stored in a video file. Typically, when the end user activates the object 18, a video sequence is displayed in a frame on the display screen. For example, an object 18 presents a graphic bitmap showing an elephant. When the end user activates the object 18, a video segment of a moving elephant is displayed in a frame.

In one embodiment, a complex behavior is one that usually involves multiple actions by an object 18 or combinations of action and media effects. Complex behaviors 50 include, for example, a path behavior. The path behavior provides a predetermined path across a display screen that an object 18 follows when the behavior is invoked by an end-user.

In general, any object behavior 26 can be associated with any object state 22. In a particular embodiment, each object behavior 26 has rules about which object state 22 it is associated with. A complex behavior is more typically associated with an activation state 38 for an object 18. However, a simple animation can be associated with a default state 30, for example, when the object 18 is animated to jump up and down continuously in place even though the end user has not provided an input to the object 18.

Figure 4:
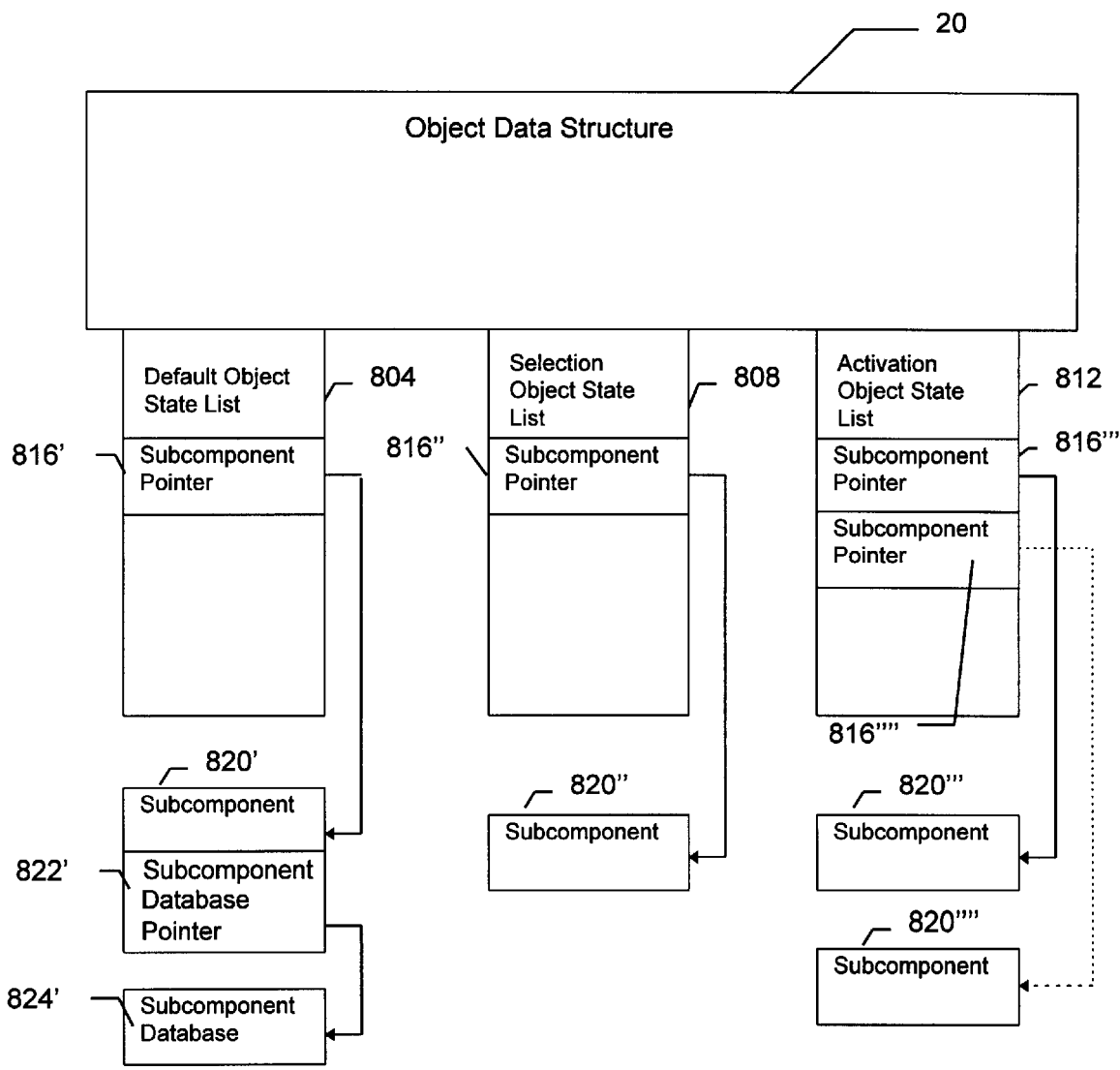
FIG. 4 is block diagram illustrating an object data structure and object state lists for an embodiment of the invention.
Figure 6:
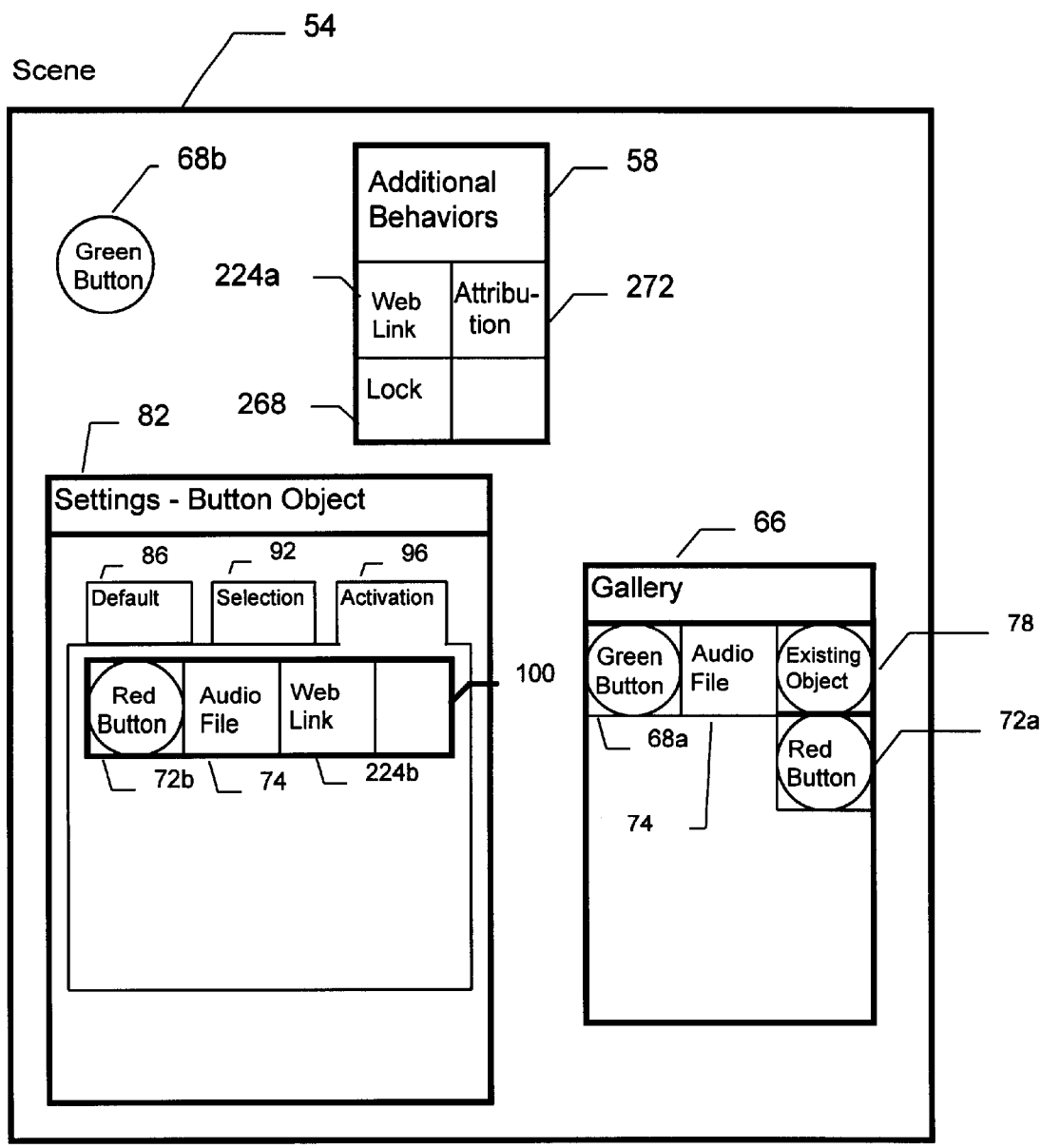
FIG. 6 is a high level view of an embodiment of an interface provided with one embodiment of the invention.

Referring to FIGS. 3 and 4, an object data structure 20 includes object state lists (804, 808, 812) of subcomponents 820 for one embodiment of the invention. FIG. 4 shows an embodiment of an object data structure 20 (FIG. 3), a default object state list 804, a selection object state list 808, and an activation object state list 812. Each object state list has one or more subcomponent pointers, shown generically as 816, pointing to subcomponents, shown generically as 820. The subcomponents 820 are object behaviors 26 that the object designer has assigned to each object state 22 for the object 18. For example, an activation state 38 (FIG. 3) is associated with an activation object state list 812 of pointers 816'" and 816"" to subcomponents 820'" and 820"" that could be an audio file 74 and a Web link 224b (FIG. 6). Thus, if an object 18 has three object states 22, such as a default 30, a selection 34, and an activation state 38, then the object data structure 20 has three corresponding objects state lists of subcomponents 820. In one particular embodiment, the lists are arranged as an array of lists or list of lists within the object data structure 20.

Subcomponents 820 can represent different types of object behaviors 26, including action 42, media 46, and complex 50 object behaviors. Some object behaviors 26, such as locking 600 or attribution 400, also can be characterized as properties of the object 18, but are included in the object state list like other subcomponents 820. In another embodiment, such behaviors are included in a separate information list in an object data structure 20.

The subcomponents 820 can be implemented as their own subcomponent objects or subobjects. Alternatively, using the list approach, the subcomponents 820 are not required to be subcomponent objects, but can be other types of software entities that can be pointed to such as files, database entries, or routines.

Each subcomponent may have a database pointer 822 pointing to a subcomponent database 824. FIG. 4 shows a subcomponent database 824', associated with subcomponent 820' but such a subcomponent database 824 could be provided with any subcomponents 820. Alternatively, subcomponent data is stored in the subcomponent 820 itself.

In one embodiment, the invention is implemented as an object maker program, which displays interactive objects 18 that can be viewed by the object designer (see FIGS. 6 and 8), and executes on the processor 14 (see FIG. 1). An object viewer is also implemented which allows the end user to view objects 18, but not to design or modify them. The object maker and viewer will be discussed in more detail later.

As is true for many object oriented system, each object 18 inherits methods from a base object class. These include methods for inserting pointers for subcomponents 816 into the object data structure 20. When the object designer assigns an object behavior 26 to an object state 22 for an object 18, then the object 18 inserts a pointer for that object behavior 26 in the list of subcomponent pointers 816 for that object state 22. For example, the object designer uses the object maker user interface to add an audio file 74 to an activation state 38 of an object 18 (see FIG. 6). Then the object maker software adds a subcomponent pointer 816 for the audio file 74 to the activation object state list 812 for the object 18. In this case, the audio file 74 could be subcomponent 820'".

Some object behaviors 26 require that the object designer enter information. Typically, this is done by providing settings and other information in a settings sheet that is displayed for that object behavior. For example, the Web link behavior 224 (see FIG. 6) requires that the object designer enter a URL for another site on the World Wide Web. This information is entered into a Web Address settings sheet 128 displayed for the Web link behavior 224 (see FIG. 8). When this occurs, the object maker stores the additional information in a separate data structure or subcomponent database 824 for the subcomponent 820, such as the Web link subcomponent, rather than in the object data structure 20 itself. The object maker can access the information when needed by using the pointer 816 to the Web link subcomponent in the object data structure 20.

When an object 18 is being viewed by the end user, the subcomponents 820' (object behaviors 26) in the default object state list 804 are active if the end user has not selected or activated the object 18. When the end user changes the object state, then the subcomponents 820 from the corresponding object state list will be activated.

In one embodiment, each object 18 inherits a set of playback methods from a base object class. These playback methods include activation, deactivation, and other functions. These playback methods work in coordination with a playback software system or engine that operates when the software is in a viewing or playback mode; for example, when the object maker software is in a playback mode, rather than an editing mode. The playback system also works in coordination with callback methods. For instance, when a collision between objects 18 occurs the callback methods for an object 18 are called indicating that the object 18 has touched the space of another object 18 or "collided" with the other object 18. A collision action behavior for the object 18 is activated and then the sequence of behaviors associated with the collision occurs.

Figure 5:
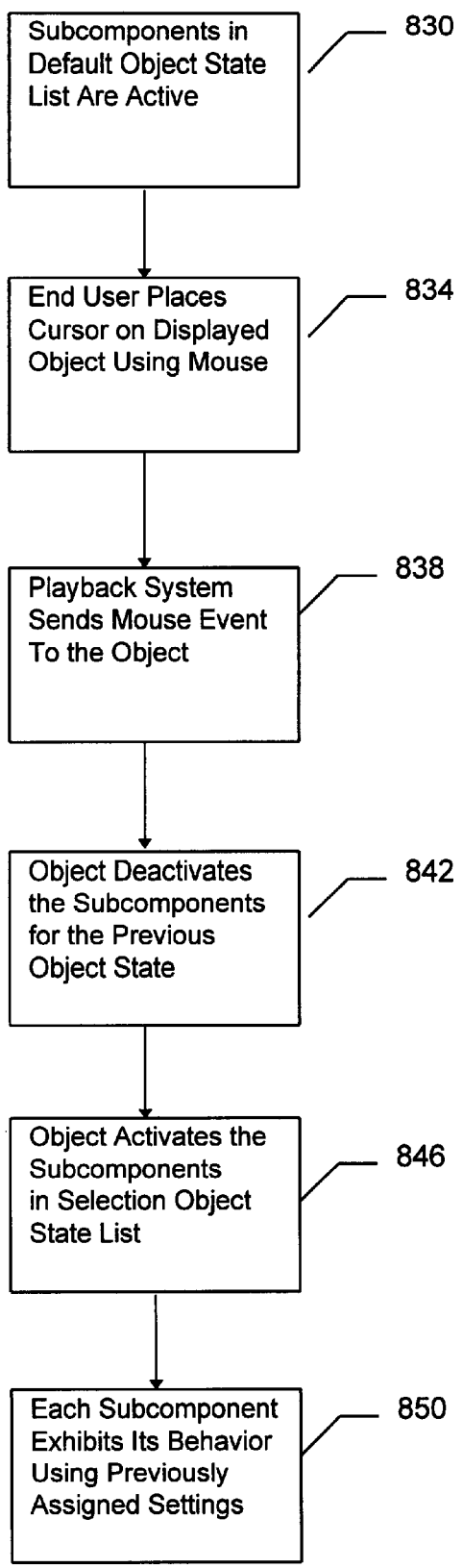
FIG. 5 is a flow chart of an embodiment of the process of changing object states for the object data structure shown in FIG. 4.

FIG. 5 is a flow chart of an embodiment of the process of changing objects states 22. Initially, the object 18 is in the default object state 30 and the subcomponents 820' (object behaviors 26) in the default object state list are active (step 830). When there is a mouse event, such as a movement of the cursor over an object 18 being shown on the display screen (step 834), the graphic user interface of the processor 14 sends the mouse event to the playback engine, which distributes this event to all of the objects 18 being displayed (step 838). Each object 18 then determines how to react to the mouse event.

For example, when the end user changes the state of the object 18 from the default state 30 by placing the cursor over the object 18 (step 834), then the object 18 traverses the list of subcomponents 820' in the default object state list 804 and deactivates each of these subcomponents 820' (step 842). The object 18 then traverses the list of subcomponents 820" in the selection object state list 808 and activates each subcomponent 820" (step 846). Each subcomponent 820" that is activated then exhibits the object behavior 26 for that subcomponent 820" based on settings that the object designer previously selected for that object behavior 26 when assigning the object behavior 26 to the selection object state 34 for that object 18 (step 850). For example, if the object designer assigned a message box behavior to the object 18 for the selection state 34, then the object 18 activates the subcomponent 820" for the message box behavior, and a message is displayed in a message box. The message is one that the object designer provided in the message box settings sheet when assigning the message box behavior to the selection state 34 of the object 18.

FIG. 6 shows a high level of view of an interface provided by the object maker software with one embodiment of the invention. The object designer can use this interface to associate different behaviors 26 with object states 22. FIG. 6 shows a scene window 54 that displays a green button object 68b and also displays a gallery palette 66 providing media behaviors 46, a behaviors palette 58 providing additional behaviors, and a settings palette 82. A palette is a graphic module displayed on the screen that can contain one or more icons of object behaviors 26. For example, in one embodiment the gallery palette 66 includes icons for media behaviors 46. The additional behaviors palette 58 includes icons for action behaviors 42 and complex behaviors 50 that are not typically available from the gallery palette 66.

The green button object 68b displayed in the scene window 54 is based on green button 68a in the gallery palette 66. The green button 68a serves as an initial media element for the green button object 68b. Generally, a button object is a graphic image showing a button (for example, a colored circle) to which object behaviors 26 can be assigned.

The user interface for an object maker program, as shown for one embodiment in FIG. 6, is implemented using any of a number of commonly used graphic user interfaces that coordinate the display of images and manipulation of these images by an end user. In one embodiment, the user interface for an object maker program is implemented using the Microsoft™ MFC interface. In one embodiment of the object viewer program, the user interface is implemented by a different user interface package, the ActiveX Template Library (ATL) user interface. Examples of an object maker and object viewer program are ThingMaker™ and Thing-Viewer™ from ThingWorld.com, LLC of Watertown, Mass. (hereinafter "ThingWorld.com").

The additional behaviors palette 58 shows icons for action behaviors 42, including a Web link icon 224a, an attribution (or copyright) icon 272, and a lock icon 268. These icons will be discussed in more detail later.

The gallery palette 66 displays icons from a gallery file. A gallery file can provide a group of related icons and objects. For example, a gallery file can contain images of different animals and audio files providing sounds made by them. Alternatively, a gallery file can contain object and media behaviors 46 of various types, but from one source, such as one Web site on the World Wide Web. The gallery palette 66 shown in FIG. 6 displays icons for a green button 68a, an audio file 74, an existing object 78, and red button 72a. The audio file 74 is a media behavior 46 that can be assigned to an object 18. The existing object 78 shown in the gallery 66 is an object 18 that an object designer previously created with assigned object behaviors 26.

The settings palette 82 shows three settings indicated by the default tab 86, the selection tab 92, and the activation tab 96. These tabs represent the object states 22 for the object 18 displayed in the scene window 54, which, in FIG. 6, is the green button object 68b. For each setting (tabs 86, 92, and 96) the settings tray 100 displays the characteristics for a given object 18 according to its settings. When the end user selects a tab (86, 92, 96) for a setting, the setting tray 100 displays the object behaviors 26 associated with that setting or object state 22.

When the green button 68b is in the default state 30, the green button 68b is displayed. When the user selects the green button 68b, for example, by placing a cursor over the green button 68b, it may turn a different color, such as orange, if an orange button has been placed in the settings tray 100 for the selection setting, 92 corresponding to the selection state 34.

In FIG. 6, the settings tray 100 shows the icons for the behaviors 26 associated with the activation setting 92 corresponding to the activation object state 38 for the green button object 68b. The settings tray 100 in the activation setting 92 indicates that for the activation state 38, the object 18 is displayed as a red button 72b, and invokes an audio file 74 and a Web link 224b. Thus, when the user activates the green button 68b, the user sees the button object change color from a green button 68b to a red button 72b (as provided for by the red button icon 72b in the settings tray 100), and the user hears the audio file 74 then a previously created Web link 224b is attempted. The settings palette 82 can also display the properties attached to the action behavior 42 or to the media behavior 46 icons that are currently displayed in the settings tray 100, and allows the object designer to edit these properties.

Figure 7:
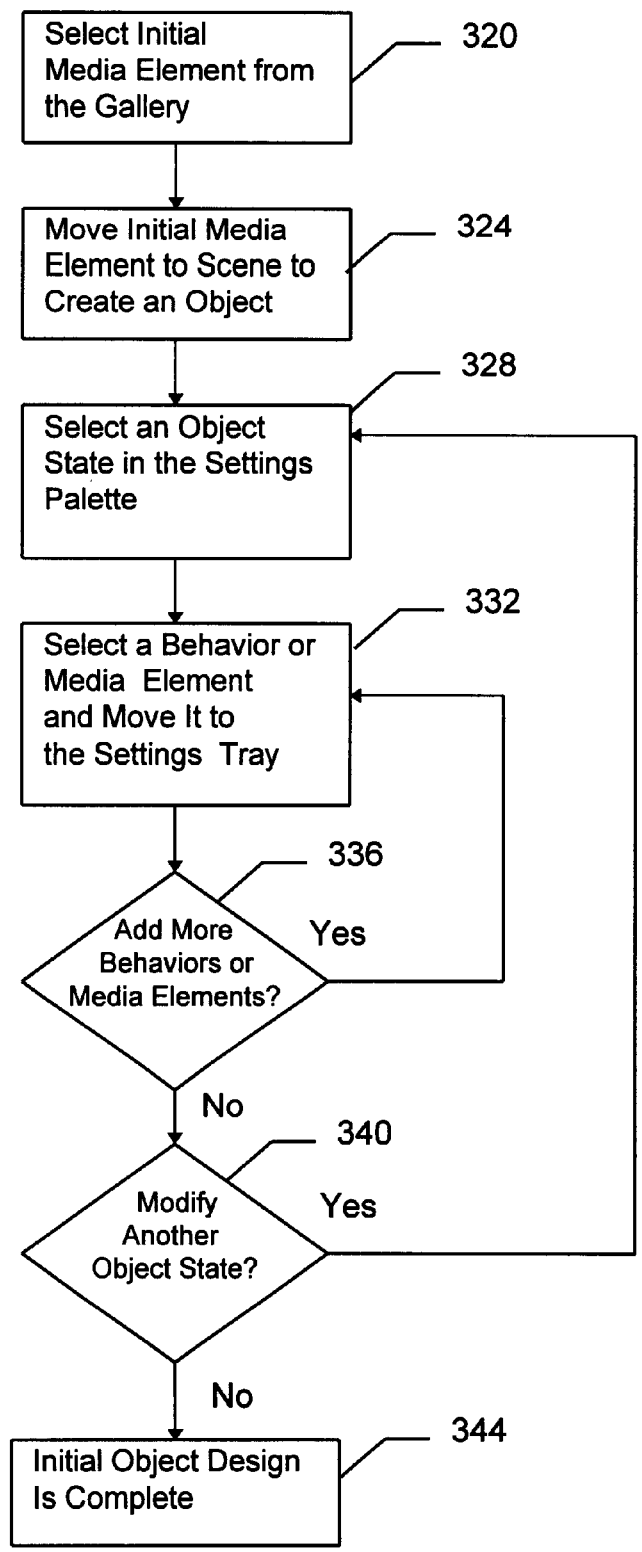
FIG. 7 is flow chart of an embodiment of an object creation and design process according to one embodiment of the invention.

FIG. 7 shows the process of creating and designing an object 18, using the interface shown in FIG. 6 to interactively assign object behaviors 26 to the object 18. The object designer selects an initial media element, such as the green button 68a, from the gallery palette 66 (step 320). The object designer then moves the initial media element to an open space on the scene window 54 to create a new object 18, such as the displayed green button object 68b (step 324). The designer selects an object state 22 for the object 18 by selecting one of the default 86, select 92, or activation 96 tabs in the settings palette 82 (step 328). The object designer optionally chooses an object behavior 26 (step 332). The behavior 26 can be a media behavior 46, such as an audio file 74, selected from the gallery palette 66. The behavior 26 can also be an action behavior 42, such as a Web link behavior 224 selected from the additional behaviors palette 58. For example, in FIG. 6, the designer has moved the icon for the generic Web link action behavior 224a from the additional behaviors palette 58 to the settings tray 100 as specific Web link 224b. The Web link behavior represented by the Web link icon 224b is different from the Web link behavior represented by Web link icon 224a, because the object designer provides a Web address for the Web link 224b that is not contained in the generic Web link 224a.

Referring again to FIG. 7, the object designer next decides whether or not to add any additional behaviors 26 to the object 18 for the currently selected object state 22 (step 336). If yes, the designer can optionally add another behavior 26 to the object 18 (step 332). If the designer does not add another behavior, the object designer then decides whether to modify another object state 22 (step 340). If yes, then object designer selects another object state 22 (step 328). If the designer decides on no further modifications, then the initial object design is completed (step 344). The object designer saves the object 18, and makes it available for distribution. At a later date, the designer can retrieve it and modify it again.

Figure 8:
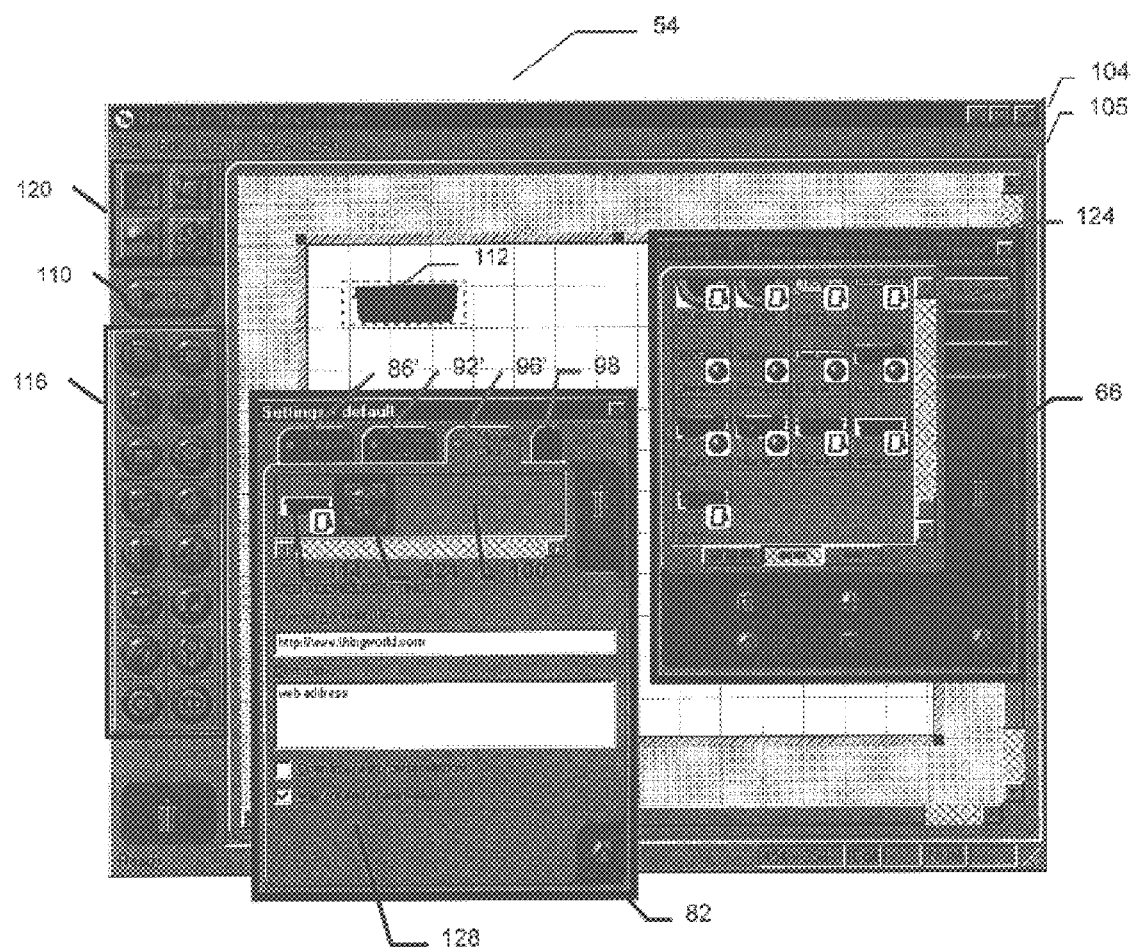
FIG. 8 is a high level view of an embodiment of a graphic user interface provided with one embodiment of the invention.

FIG. 8 shows a view of an embodiment of the interface for an embodiment of the invention using the object maker program. The object maker displays interactive objects 18, such as object 112 in FIG. 8, that can be viewed within a Web browser or as a stand alone player application. In the object maker embodiment, the interactive objects 18 are arranged in a scene. The scene is played by invoking a playback mode or by using a separate application, an object viewer, which is a plug-in to a World Wide Web browser.

FIG. 8 shows a scene window 54 with a scene header 104, a menu bar 105, a play button 110, a displayed object 112, a settings palette 82, an actions palette 116, a tools palette 120, a gallery palette 66, and a gallery header 124. The scene header 104 displays the name of the object maker scene file being viewed, and the menu bar 105 displays the names of command menus that the end user can select. The gallery header 124 provides the name of an object maker gallery file containing the media elements and behaviors 46 shown in the gallery 66. The scene window 54 operates in either the editing mode or the playback mode. The object designer uses the editing mode when creating and designing objects. Selecting the play button 110 invokes the playback mode and tests the displayed object 112 by "playing" it in the scene window 54. To do this, the object designer uses the input device 10 to select an object state 22 for the displayed object 112 and then selects the play button 110 to play the object behaviors 26 associated with that object state 22. After the play button 110 is selected, it is replaced with an edit button (not shown). The object designer selects the edit button to stop the playback mode and return to the editing mode to make further modifications to the displayed object 112. The object designer can also invoke the playback mode by using the Control menu in the menu bar 105.

The settings palette includes a settings tray 100, Default object state tab 86', a MouseOver object state tab 92' (referred to in FIG. 6 as a selection tab 92), a MouseClick object state tab 96' (referred to in FIG. 6 as an activation tab 96), an Information Tab 98, and Web address settings sheet 128 which is present because the Web address icon 224 has been placed in the settings tray 100. The MouseOver object state tab 92' corresponds to the selection object state 34, and the MouseClick object state tab 96' corresponds to the activation object state 38. In a particular embodiment, a mouse can have more than one button, and additional object states 22 can be associated with the additional mouse buttons. The settings tray also shows an icon 114 for the object being displayed 112.

When the Information Tab 98 is selected by the object designer, the settings tray 100 displays information about the contents of the displayed object 112, as well as the Lock 268, Copyright 272, Keyword 264, and ID/Credit 276 action icons if any of these have been assigned to the displayed object 112. (These icons represent the locking, attribution, keyword, and identification action behaviors, which will be discussed later.) While the Information Tab 98 appears alongside the tabs for the three object states 22 for the displayed object 112, the Information Tab 98 is not an object state 22. It is a container for administrative information about an object 18.

The Information Tab 98 can be selected to display the information settings sheet in the settings palette 82. Here, one may find a text listing of the name, the media, media size, and the actions contained in the separate object states 22 of the object 18, as well as a description of the object 18. The object designer can also use the information settings sheet to rename the object 18.

In the settings palette 82, if the Web address behavior is selected, the user must provide Web link information in the Web address settings 128 for a Web link icon 224 associated with the displayed object 112. The actions palette 116 and tools palette 120 are two embodiments of the additional behaviors palette 58 depicted in FIG. 6. Generally, the actions palette 116 contains icons for action behaviors 42, while the tools palette 120 contains icons for tools or complex behaviors 50.

The gallery 66 contains icons for media elements or behaviors 46. The gallery 66 provides a storage area for the source material used when creating an object 18. The default gallery file is always available and can not be closed. The designer can create multiple galleries 66 and can copy source material from one gallery 66 to another.

In the object maker embodiment, each palette can be collapsed into a title bar. Once the palette is collapsed, the designer can place it in the scene window 54 with other collapsed palettes and keep the unused palettes out of the way. The designer can show or hide palettes by selecting the appropriate command from the View menu in the menu bar 105.

In one embodiment of the invention, each palette or module shown in FIG. 8 is implemented by a corresponding software module. Thus, there are settings, gallery, tools, and actions software modules corresponding to the settings palette 82, the gallery 66, the tools palette 120, and the actions palette 116.

Multimedia elements are created by first importing digital media (such as images and sound) into the gallery 66. This is done by clicking on the "Add to Gallery" button on the gallery palette 66, which brings up an open file dialog box that allows the object designer to select the media elements to be imported as media elements or behaviors 46, which are also termed initial media elements or objects. Digital media is defined as any digital image, sound file, animation file or digital video file that can be imported into object maker application. When the media elements or behaviors 46 are imported into the gallery 66, the gallery module imports them as objects 18. Initially, the objects 18 do not contain any other behaviors 26 beyond the media element, such as a graphic image, that was imported. If a bitmap graphic file is imported into the gallery 66, then the gallery module creates an initial media object with an object data structure 20 that includes a bitmap as a subcomponent 820. The object designer can move the icon for the imported media element from the gallery 66 to the scene window 54 and then add other behaviors 26 to it to make a more complete or fully functional object 18. When the object designer moves the icon for the initial media object from the gallery 66 to the scene window 54, then a copy of the initial media object is made to create the displayed object, such as displayed object 112 in FIG. 8.

Each object 18 inherits from a base class that has a copy or clone method, which is invoked when the object designer moves the object's icon to the scene window 54 to copy the initial media object into the displayed object, and a remap object references method which may also be invoked. In general, the remap object references method may be invoked if the object 18 has associations or references to other objects 18, for example, when several related objects 18 are displayed together in one scene. When the remap object references method is invoked, it insures that any references to other objects 18 are also copied appropriately. The clone method will also recursively copy any subcomponents 820 of the object 18, including any subcomponents 820 that have their own sub-subcomponents.

In one embodiment of the invention, objects 18 are grouped as compound objects, in which case the cloning and remapping methods copy the compound object and the relationships among the objects 18 in the compound object appropriately to accurately duplicate the compound object.

Object maker supports importing files with the following formats:

| File Extension | File Type |
|---|---|
| .bmp | Bitmap |
| .fpx | FlashPix |
| .gif | GIF |
| .jpg | JPEG |
| .pct | Macintosh PICT |
| .mac | MacPaint |
| .msp | MS Paint |
| .pcx, .dcx | PCX Files |
| .pcd | PhotoCD |
| .psd | PhotoShop |
| .png | PNG |
| .eps | PostScript |
| .ras | SUN Raster Files |
| .tga | TARGA |
| .tif | TIFF |
| .wmf | Windows MetaFiles |
| .wpg | WordPerfect Raster Files |
| .wav | Wave (sound Files) |
| .tms | ThingMaker Scene |
| .tmg | ThingMaker Galleries |

In one embodiment of the invention, files or objects that have been imported into the gallery 66 (or stored there) are labeled as being one of several types. If a graphic image has been imported into the gallery 66, then it is a single image type of object. If several images have been imported together as an animation, then it is an animation type. If the object 18 was created by using the shape creation tool (to be discussed later), then it is a shape type. If the object 18 has been modified by the object designer in the scene window 54, then the object 18 is an object or "Thing" type.

The object designer replaces media elements or behaviors 46 by moving or dragging icons for them from the gallery 66 to the settings tray 100 in the settings palette 82. This is done by dragging them to either the appropriate tab (Default 86', MouseOver 92', MouseClick 96', or Information Tab 98), or by first clicking one of the tabs and then moving the media behavior 46 to the settings tray 100 in the settings palette 82. Clicking a state tab changes the display to show the icons for the object behaviors 26 assigned to that object state 22. Clicking on the Information Tab 98 displays the icons, for the locking, attribution, keyword, and/or identification behaviors that may be assigned to the object 18 under this tab.

The settings tray 100 displays the icons for the media elements or behaviors 46, action behaviors 42, and/or complex behaviors 50 attached to the object 18 for the selected object state 22. Clicking on behaviors 26 in the settings tray 100 displays the properties or settings for the selected behavior 26, and lets the user adjust these settings. Action behaviors 42 are added to an object 18 in the same way as media elements or behaviors 46, except that the icons are moved from the actions palette 116 to the settings tray 100 or one of the tabs (86', 92', 96'). Behaviors 26 can be deleted from the settings palette 82 by dragging them from the settings tray 100 to a trash can icon in the settings palette 82. Icons for media elements or behaviors 46 can be dragged from the settings palette 100 to the scene window 54 to create new objects 18.

Changing between the settings tabs (86', 92', 96') in the settings palette 82 will update the display of the object 18 in the scene window 54 when in edit mode. When in play mode (which lets the object designer preview the scene as it will appear in the player application) the object(s) 18 reverts to the default object state 30 until the state 22 is changed by the object designer, or the mode is changed back to edit mode. The play mode can be invoked by invoking the play button 110 from the scene window 54. When the object designer completes the design process, the completed object 18 is saved in a scene file, which can contain multiple objects 18. Objects 18 in the scene file are stored in the same format used in a gallery file. When the scene or gallery file contains multiple objects 18, the objects 18 may use the same media elements 46 such as an audio file 74. In this case, the scene or gallery file includes only one copy of the media element 46. Thus if a scene or gallery file is copied to another Web site, the file contains all the media elements required for the objects 18 in the file, but does not contain duplicate copies of media elements 46 that would make the file larger than is necessary.

Figure 9:
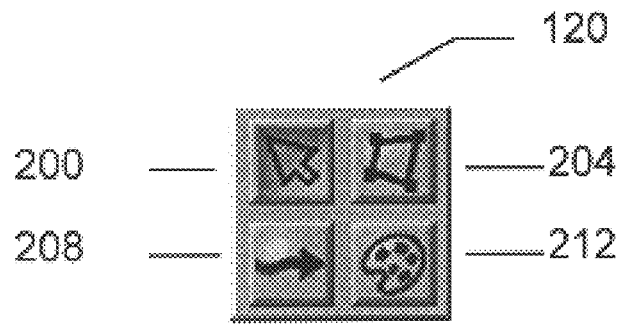
FIG. 9 shows an embodiment of a palette of tools icons used with the graphic user interface shown in FIG. 8.

FIG. 9 depicts the tools palette 120, which shows the icons associated with four of the complex behaviors 50: the pointer behavior, the path behavior, the shape behavior and the color behavior.

The tools palette 120 represents the tools software module. The tools module implements the user interface for the tools palette 120. When a tool is selected from the tools palette 120, then the tools module activates the tool. In general, the tools behaviors are creation or editing tools that can be used to create or modify objects 18 and other components. The tools behaviors are different from other behaviors in that each tools behavior has a software module of its own that implements the tool. Each tool behavior can be thought of as an active tool that plays a role in translating user input events, such as mouse events, into software message or commands used to modify objects 18, scenes, or subcomponents 820 of objects 18, or their attributes, such as their color.

The pointer behavior is represented by the Pointer Tool icon 200 and is used to select and reposition objects 18 in the scene window. The object designer selects the Pointer Tool icon 200 and then selects individual objects 18 by clicking on them. When the object designer selects the Pointer Tool icon 200, the tools module invokes the pointer module which implements the selection and positioning functions used by the object designer. To select more than one object 18, the object designer clicks and drags a rectangle around all of the objects 18 in the scene. When the designer clicks and drags one of the selected objects 18, the other selected objects 18 will move with it. The pointer module does not create a separate subcomponent 820 that can be added to an object data structure 20, and thus the Pointer icon 200 cannot be added to the settings tray 100 in the settings palette 82.

The shape behavior is represented by the Shape Tool icon 204. The object designer selects the Shape Tool icon 204 to create polygonal shapes in the scene window 54 which can be used as objects 18. When the object designer creates a shape in the scene, the shape tool creates an object 18 with the shape stored in a subcomponent 820. Once a shape is created, the object designer can treat it like any other object 18; in other words, he can add actions to it and edit it with the shape or other tools. Shapes also can be made transparent and used as "hot spots" on top of other objects 18. Shapes can be moved to the gallery 66 like other objects 18.

When the object designer selects the Shape Tool icon 204, then the tools module actives the shape creation module, which the object designer uses to create the shape. The shape module then creates a shape component which can be included as a Shape icon 204 in the settings tray 100 for a selected object state 26, such as a default object state 30. The object 18 then adds the shape component as a subcomponent 820' for the default object state list 804 for that object 18. When the object designer selects the Shape icon 204 after it has been moved to the settings tray 100, a separate shape editing module is invoked to allow the object designer to edit the shape that was previously created for the object 18.

The path behavior is represented by the Path Tool icon 208. The object designer selects the Path Tool icon 208 to draw a path. A path is a series of lines between control points along which an object 18 can travel. The object designer can create different paths for different object states 22 or put a path in one state 22 only.

When the object designer selects the Path Tool icon 208, then the tools module actives the path creation module, which the object designer uses to create the path. The path module then creates a path behavior which can be included as a Path icon 208 in the settings tray 100 for a selected object state 22, such as a activation object state 38. The object 18 then adds a corresponding path subcomponent as a subcomponent 820''' to the activation object state list 812 for that object 18. When the object designer selects the Path icon 208 in the settings tray 100, the path editing module is invoked to allow the object designer to edit the path that was previously created for the object 18.

The color behavior is represented by the Color Tool icon 212. The object designer selects the Color Tool icon 212 to change the color of graphics, shapes, and the scene window background. When the object designer selects the Color Tool icon 212, the tools module activates the color tool. The color tool displays a color editing interface that allows the object designer to select a color, which the object designer applies to an object 18 or to another location, such as the background of a scene. The color tool does not create a separate color subcomponent that can be added to the object state lists of an object data structure 20.

In a further embodiment of the invention, additional complex or tools behaviors are provided, such as sound creation and editing tools, and bitmap creation and editing tools.

Figure 10:
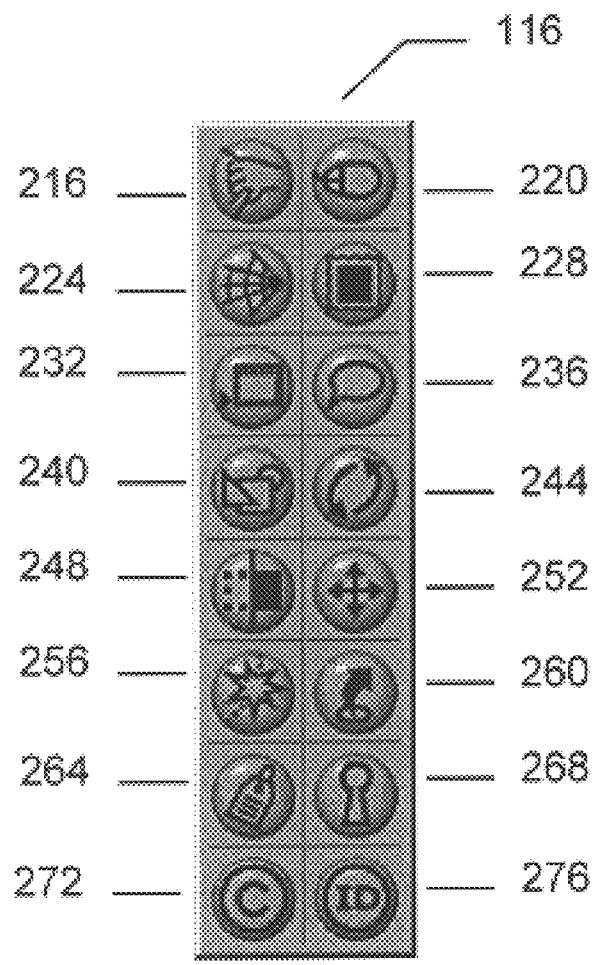
FIG. 10 shows an embodiment of a palette of action icons used with the graphic user interface shown in FIG. 8.

FIG. 10 shows the actions palette 116, which shows the icons for the action behaviors 42, including the drag, cursor, Web address, mail address, status text, message box, layer, swap, hide/show, location, collision, send script event, keyword, lock, copyright, and identification action behaviors. Each action behavior 42 has an associated icon. For example, the Web Address icon 224 is associated with a Web address (or Web link) action behavior. The actions palette 116 has an associated actions module. The action module includes a template behavior for each of the action behaviors 42. Each template behavior has only default values for the settings associated with that behavior 42. When the object designer moves an icon from the actions palette 116 to the settings tray 100, only a template of the behavior 42 is moved. After being placed in the settings tray 100, the settings module opens the settings sheet for that behavior 42. The object designer then can replace the default settings of the template with the desired settings, and these settings are stored with the subcomponent 820 for that behavior 42 that is included with the object data structure 20.

The drag action behavior is represented by the Drag action icon 216 and is used to move objects 18 in the scene by clicking and dragging. The drag action behavior only functions in the MouseClick 96' state. It cannot be added to the Default 86' or MouseOver state 92' states. The drag action allows the end user to move the object 18 in any direction, whereas the path behavior forces the object 18 to move in a predetermined direction or path only, when the end user attempts to move the object 18 with a mouse A drag action can also exist for an object 18 that has had a path added to the MouseClick state 96'. When the object 18 is dragged, it will move along the path that has been established, rather than follow the cursor. If the object designer sets the parameter to drag left, then when the cursor drags left, the object 18 will move "forward" along the path, since the path is the determinant of the forwards and backwards parameters even if the path is actually traveling left to right, and the object 18 appears to move in the opposite direction to which the cursor is being dragged. The movement along the path is based upon the speed at which the end user drags the cursor on the screen. The path does not follow the cursor.

The cursor action behavior is represented by the Cursor icon 220 and is used to define the shape of the cursor that interacts with an object 18.

The Web link or Web address behavior is represented by the Web Address icon 224 and is used to open a Universal Resource Locator (URL) or Web address in the Web browser. This action can be applied either to the MouseOver 92' or MouseClick 96' state. The object designer uses it to turn objects 18 into navigational buttons.

The mail address behavior is represented by the Mail Address icon 228. This behavior is similar to the Web link behavior in that it is an instruction that is executed by the Web browser. If the browser is set up to support the mail address behavior, this mail address behavior causes a mail form to open and fills in the "mail to" and "subject" fields.

The status text behavior is represented by the Status Text icon 232 and is used to display a text message at the bottom of the browser window. To use this action, the object designer adds the Status Text icon 232 to either the MouseOver 92' or MouseClick 96' states of the object 18 and types the text that is to appear in the browser Status Bar Text Field. The designer uses the status text action in the MouseOver state 92' to provide feedback about where the button will take the user.

The message box action behavior is represented by the Message Box icon 236 and is used to display a dialog box containing the text entered in the Message Box Settings sheet. This icon can be added to the MouseOver 92' or the MouseClick 96' state.

The layer action behavior is represented by the Layer icon 240 and is used to change the order in which objects 18 are drawn on the screen. Each object 18 in the scene is assigned to a unique layer when it is added to the scene; the second object 18 added will have a higher layer number, and will appear to be on top of or above the first object 18 that was added to the scene in one embodiment. Once the scene is in playback mode, the layer action behavior can be used to change the layer of an object 18 temporarily for the rest of the scene. The lowest layer is 0. The highest layer possible is 999. To set up the layer action, the object designer first adds the Layer icon 240 to the MouseOver 92' or MouseClick 96' state of an object 18. Next, the designer chooses the object 18 that will be affected. The settings sheet in the settings palette 82 will default to the object 18 to which the action was added, but the designer can choose any other object 18 in the scene. Then, the designer chooses how to change the layer of the object 18.

The swap action behavior is represented by the Swap icon 244 and is used to switch the location, visibility, and layer properties of two objects 18. The object designer can choose which of the properties are to be switched, as well as the two objects 18 in the scene which will switch their properties. (If no properties are chosen, the swap action behavior has no effect.) The swap action can be used to switch the parameters of the object 18 containing the action with another object 18 in the scene, or to switch the parameters of two other objects 18 in the scene. The swap behavior may be useful in a collision or an animation situation, where two objects 18 collide or exchange positions with each other.

The hide/show action behavior is represented by the Hide/Show icon 248 and is used to choose whether an object 18 is visible or not. It can be used to change the visibility of the object 18 containing the action, or to change the visibility of another object 18 in the current scene.

When objects 18 are added to a scene they are visible, but the object designer can change this by using the hide/show action behavior during playback, or even before the scene starts playing. To change the visibility of an object 18 while in edit mode, the designer uses the hide object command in the Edit menu in the menu bar 105 (see FIG. 8).

The location behavior is represented by the Location icon 252 and is used to move the selected object 18 to a new position on the screen. The position can be based on the current location of the object 18, the location of another object 18, or a random location. With this feature, the object designer can move the object 18 that the location action is attached to, or any other object 18 on the scene. The Location icon 252 can only be applied to the MouseOver 92' and MouseClick 96' states of an object 18.

The collision behavior is represented by the Collision icon 256 and is used to indicate what behaviors 42 will occur when two objects 18 collide. The collision action behavior can include one or more of the action behaviors 42 in the object maker. The Collision icon 256 can be added to any object state 22 of an object 18 and be set in motion, when the object 18 collides with any other object 18. Unlike other actions, the collision action is not actually triggered when the object 18 changes states. Instead, it can only be triggered within a state 22; that is, the object 18 must collide with another object 18 in that state 22 to actually trigger the collision. For example, if the designer adds a Collision icon 256 to the MouseClick state 96', then the end user must have the mouse button pressed down on the object 18, and it must collide with another object 18 to trigger the Collision action.

Once the object designer has added the collision behavior to an object 18 and has chosen whether the collision is triggered when the object 18 collides with any other object 18 or with a specific object 18, the designer can specify the action behavior 42 that will occur. The choices are: hide/show, location, message text, status text, layer, mail address, swap things, or Web address behaviors. The parameters for these actions 42 are available in the Action Tab of the Collision settings sheet displayed in the settings palette 82. The designer can add multiple Collision icons 256 to the same object state 22 of an object 18.

The send script behavior is represented by the Send Script Event icon 260 and is used to generate a special event that can be used by a script on an HTML page. The script can be a JavaScript or a VBScript. In a further embodiment, the script can be in any computer programming or scripting language suitable for use on a Web page. The event will have two arguments, the name of the object 18 generating the event and the text that the object designer specifies for the event. Events are sent to the Web browser's scripting engine. If the Web page containing the object 18 has an event handler for the event, then it will be executed.

The keyword behavior is represented by the Keyword icon 264 and is used to categorize and store words that describe an object 18. This information can be used by a Web search engine to index objects 18 on the Web. A list of "standard" keywords is provided, but the object designer can add her own collection to the list. For example, if an object 18 displays an image of a jet airplane, then the object designer can add keywords, such as "airplane" and "jet", to the keyword settings sheet associated with the keyword behavior. Thus, an end user looking for an image of a jet airplane on the Web can locate the jet airplane object 18. Objects 18 can also be classified by type, a broad method of categorizing objects 18. The Keyword icon 264 can only be added to the Information Tab 98 in the settings palette 82 of the object 18. Only one keyword action behavior can be attached to an object 18. The keyword action cannot be attached to scenes.

The locking behavior 600 (see also FIG. 18) is represented by the Lock icon 268 and is used to prevent others from using or altering the object designer's object 18, once it is on the Web. Objects 18 that do not contain a lock action 600 are not protected and, therefore, can be reused by anyone. Objects 18 that have a lock action 600 may be protected completely, or have limited protection, depending on the conditions the object designer sets up. In one embodiment, the Lock icon 268 must be added to the Information Tab 98 of an object 18, and only one Lock icon 268 can be attached to an object 18. In one embodiment scenes cannot be locked. If the scene contains multiple objects 18, each one must be locked individually. (The lock action behavior 600 is discussed in more detail later.)

The copyright action behavior is represented by the Copyright icon 272 and is used to attach an authors credit to an object 18. In one embodiment of the invention, the copyright action behavior may provide additional information beyond a copyright notice, and may also be referred to as an attribution behavior 400 (see also FIG. 11). The copyright action also provides a link back to the object designer's object maker ID page, so that end users who are interested in the designer's objects 18 can determine who the object designer is.

In one embodiment, before using the copyright action, the designer must register at an object maker Web site and obtain an registration ID file. The object designer loads this file into the object maker and provides the link between the objects 18 and the object maker Web site. (The copyright or attribution behavior 400 is discussed in more detail later.)

The identification behavior is represented by the ID/Credit icon 276 and is used to provide additional identification and credit information for an object 18. The object designer uses the identification behavior to identify individuals who contributed to the design of an object 18. Each individual to be identified must have an object maker ID that links to an ID page for that individual at the object maker Web site, which provides more detailed information about the individual.

An additional complex behavior is the animation behavior, which provides an animated sequence for the object 18. The animation behavior is typically an animation of the object 18 itself. For example, when an end user activates an animation behavior for an object 18 displaying a graphic image of an elephant, the graphic image itself becomes animated, and may start walking across the screen. In effect, it appears that the displayed object 18 itself is an animated elephant.

The object designer creates an animation behavior when he imports two or more graphic files into the gallery 66 at the same time and designates that these graphic files be combined into an animation by choosing the create animation option under the open file dialog box. A new object 18 is created and designated as an animated type of object 18.

Each action behavior inherits from a component base class. In a further embodiment of the invention additional actions are implemented as new subclasses of the component base class.

The software settings module is represented by the settings palette 82 (see FIG. 8) and can be considered the high level editor that implements much of the logic and protocols on how objects 18 are built For example, when an object designer moves an icon from the gallery 66 to the settings tray 100 in the settings palette 82, the settings module implements the drag and drop protocols that determine where the icon can be validly moved. When the object designer first moves the icon for an object 18 or media behavior 46 from the gallery 66, the gallery module starts up a "moving icon" window or process. The moving icon process is a window that receives mouse events. For example, if the object designer moves the icon by placing the cursor on it with a mouse, the moving icon window receives the mouse events indicating the movement, and then moves the icon over the display screen accordingly. As the icon moves over the object maker GUI (graphic user interface), the moving icon window queries each "window"

that it encounters in the interface. A window represents another object 18 or a part of the object maker GUI.

For example, the tabs in the settings palette 82 are windows on the object maker GUI, and as the object designer moves an icon over the settings palette 82, then the moving icon window repeatedly queries the tabs to determine whether the icon may be validly dropped onto one of the tabs that the icon is over. Some icons can only be dropped onto certain tabs in the settings palette 82. For example the Lock icon 268 can only be dropped on the Information Tab 98 or this tab's associated settings tray 100. If the Lock icon 268 is over the Information Tab 98, then the settings module would indicate to the moving icon window that this is a valid drop location, and the object designer would be allowed to drop the Lock icon 268 into the settings tray 100 for the Information Tab 98. If the icon is over the default tab or its associated settings tray 100, the settings module indicates to the moving icon process that this is not a valid drop location for the Lock icon 268. When the object designer stops moving the icon and it is over a valid drop location, then the moving icon window indicates to the settings module to accept the drop of the icon.

The object designer can use the object maker's Publish function to create an HTML file or tag for a scene. The designer can also select a single object 18 in a scene, and export that to its own separate scene file. The object designer must select "Publish" from the File menu accessed through the menu bar 105. The object designer can then use the publish function to create an HTML file that contains an HTML tag for the scene file currently being displayed in the scene window 54 or for a scene file containing the object 18 selected by the object designer. The object designer can then use the HTML file as created by the publish function or can copy the HTML tag into another HTML file where the object 18 is to be displayed.

In the object maker embodiment, objects 18 are primarily designed for distribution and viewing on the Internet or World Wide Web, though they may also be distributed and viewed via any electronic means of transmission, including, but not limited to: floppy disk, magnetic tape and CD-ROM. The separate object viewer application is required to display the object maker files that contain these objects 18. The object viewer is a plug-in application that works with a Web browser application, though it could also exist as a standalone player application. The object viewer provides a method of viewing the objects 18. Typically, another person (the end user) will view the object 18 using the object viewer. The end user first accesses a Web page that contains an object maker file. This launches the object viewer application, which displays the objects 18 contained in that file. In one embodiment this object viewer program is ThingViewer™ from ThingWorld.com.

Two object behaviors 26, the attribution behavior 400 and the locking behavior 600, relate to issues of ownership and control of objects 18. The attribution behavior 400 allows an owner or author of an object 18 to provide attribution ownership and/or copyright information for an object 18. The locking behavior 600 allows an owner of an object 18 to prevent others from modifying the object 18, or restrict how they may modify it. The attribution behavior 400 and locking behavior 600 are discussed in more detail below.

Attribution

Figure 11:
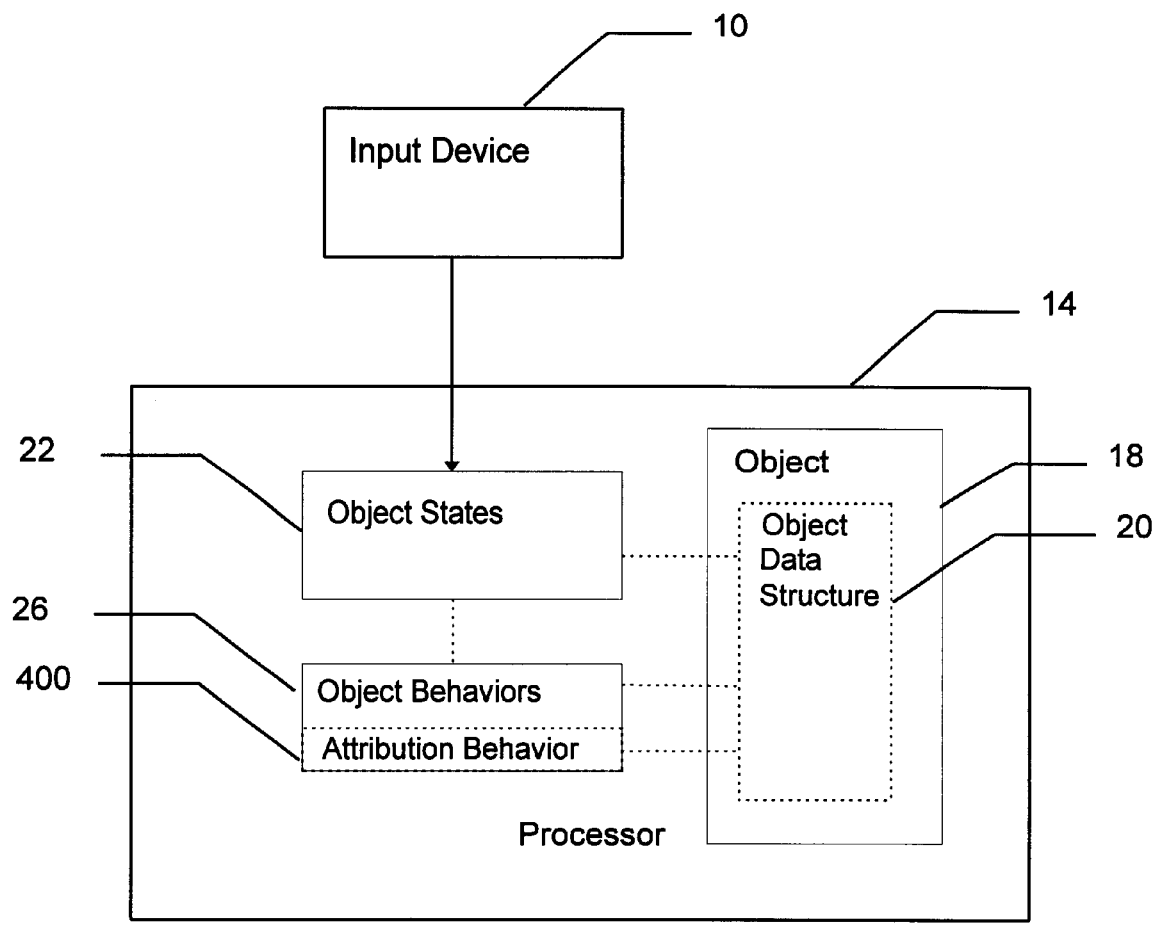
FIG. 11 shows a high level functional block diagram of an embodiment of an attribution behavior for one embodiment of the invention.

In one aspect of the invention, the object behaviors 26 include an attribution feature. FIG. 11 shows this attribution feature as an attribution behavior 400 in a high level functional block diagram of one view of the invention. FIG. 11 also shows an input device 10, a processor 14, an object 18, object data structure 20, object states 22, and object behaviors 26, which have been previously described.

The attribution behavior 400 provides attribution information about the object. In one embodiment, the attribution information is copyright information. In another embodiment, the attribution information includes copyright, ownership, authorship, and/or sponsorship information relating to an object 18.

Figure 12:
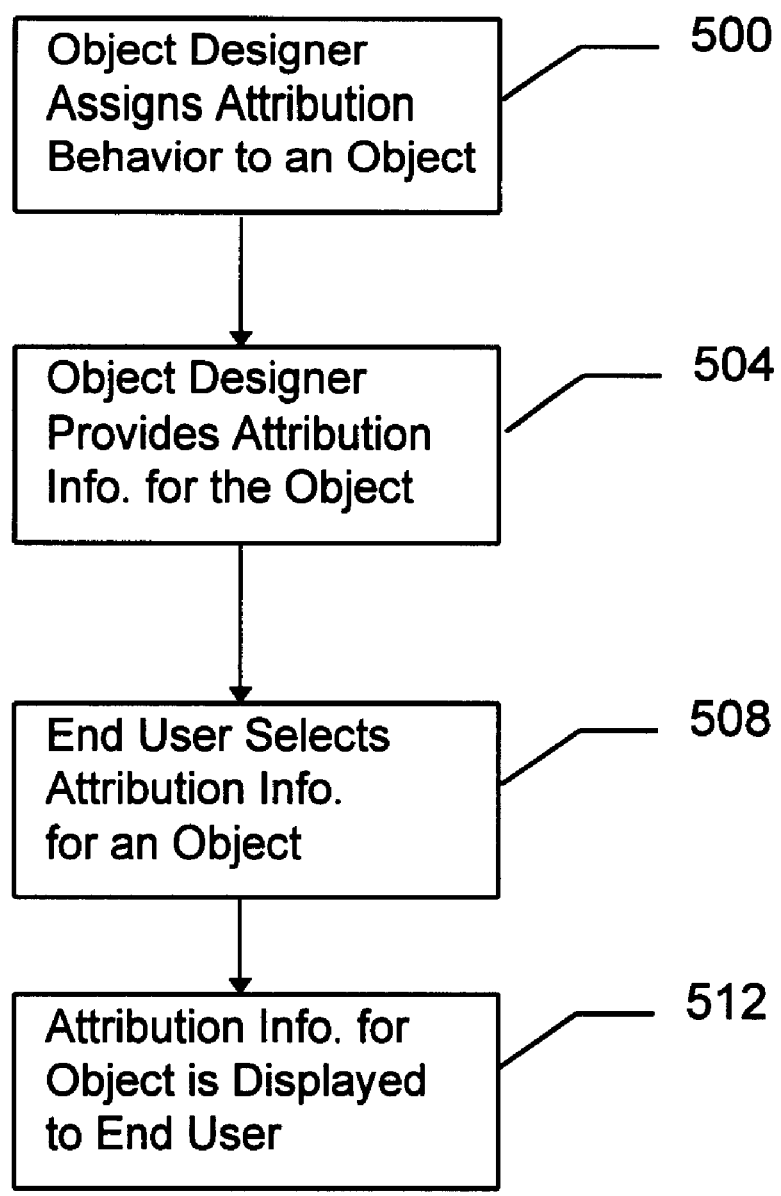
FIG. 12 shows a high level flow chart of an embodiment of a process of creating and viewing attribution information for the embodiment of the invention shown in FIG. 11.

FIG. 12 shows a high level flow chart of the process of creating and viewing attribution information according to one embodiment of the invention. An object designer assigns the attribution behavior 400 to an object (step 500) and provides the attribution information, such as copyright information (step 504). Once the attribution information has been assigned to an object 18, an end user of the object 18 may select the attribution information for that object 18 using the input device 10 (step 508). In a particular embodiment, the end user selects for the attribution information for an object 18 by clicking on the right button on a mouse. The attribution information provided by the object designer in step 504 is then displayed to the end user (step 512).

Typically, the attribution behavior 400 is an action behavior 42, although it may also be treated as a complex behavior 50. In one embodiment, the attribution behavior 400 is typically assigned to the Information Tab 98' on the settings palette 82 (see FIG. 8). In a further embodiment, the attribution behavior 400 is treated as a property of the object 18, although, in practice, the user assigns it to an object 18 from an Actions palette 116.

Figure 13:
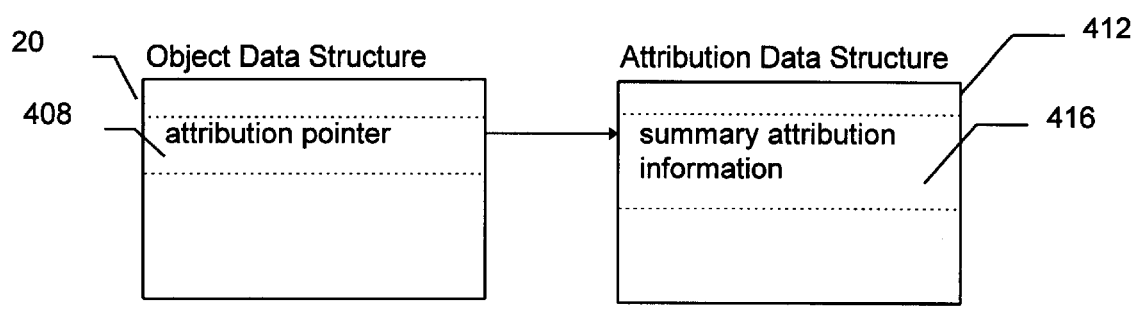
FIG. 13 is a block diagram showing an embodiment of the data structures associated with attribution for one embodiment of the invention.

FIG. 13 is a block diagram showing the data structures associated with attribution for one embodiment of the invention. FIG. 13 shows the object data structure 20, an attribution pointer 408, the attribution data structure 412, and summary attribution information 416. The attribution pointer 408 links the object data structure 20 to the attribution data structure 412, which includes summary attribution information 416, which is provided by the object designer (see FIG. 12). When the end user selects the attribution information for display, the processor 14 uses the attribution pointer 408 to access the attribution data structure 412 and display the summary attribution information 416. Depending on the embodiment, the summary attribution information 416 can be relatively concise, such as a copyright notice. In a further embodiment the summary attribution information can include a list of credits for individuals who contributed to the design of the object 18. In one embodiment, the object designer uses the identification behavior (ID/Credit icon 276) to add a list of credits. More detailed information can be provided in the detailed attribution information 432 described below.

Figure 14:
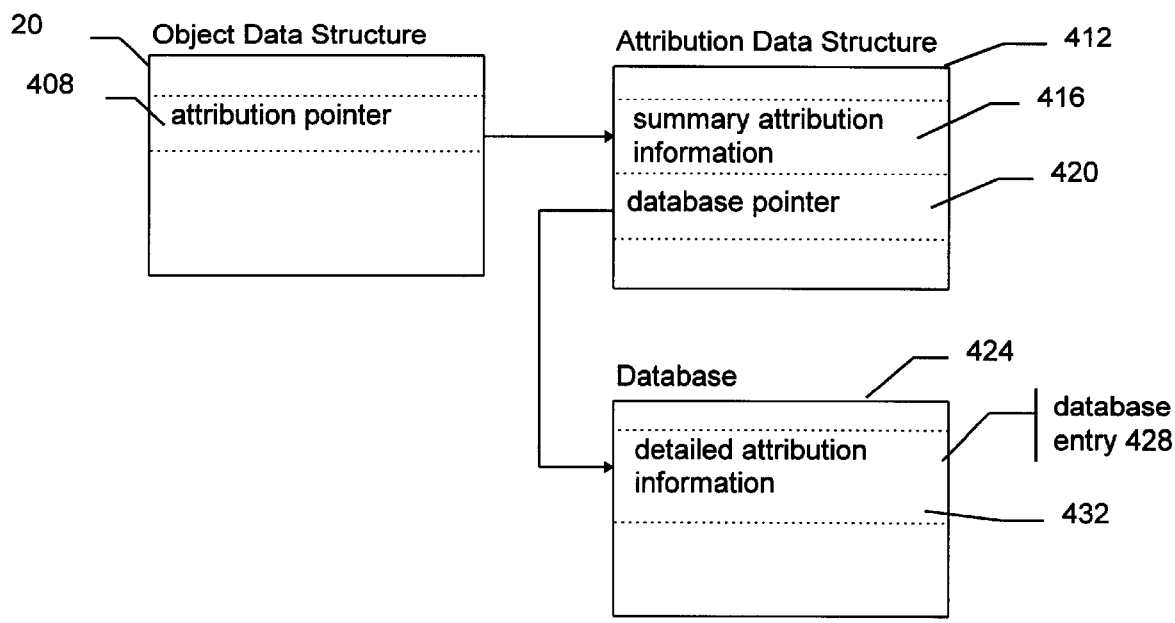
FIG. 14 is a block diagram showing a more detailed view of the embodiment of the data structures referred to in FIG. 13.

FIG. 14 is a block diagram showing a further embodiment of the data structures referred to in FIG. 13. FIG. 14 shows the object data structure 20, the attribution data structure 412, and a database 424. The object data structure 20 includes an attribution pointer 408 as described for FIG. 13. The attribution data structure 412 includes summary attribution information 416 and a database pointer 420. The database pointer 420 links a database entry 428 in the database 424 to the attribution data structure 412. The database entry 428 includes detailed attribution information 432, which provides additional attribution information beyond the summary attribution information 416.

The database 424 resides locally and is in communication with the local processor 14. In an alternate embodiment, the database 424 is a remote database server that is connected to the processor 14 through a network or communication link.

Figure 15:
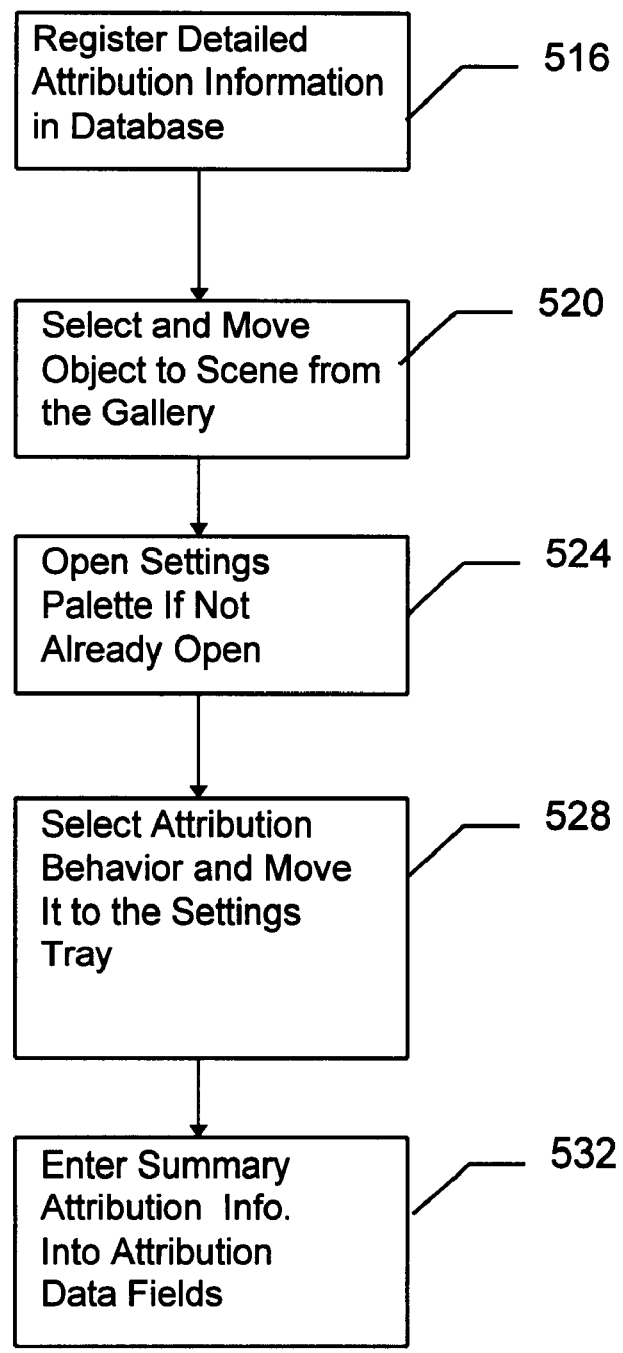
FIG. 15 is a flowchart summarizing an embodiment of the process of adding attribution information to an object for an embodiment of the invention.

FIG. 15 is a flowchart summarizing the process of adding attribution information to an object 18 for an embodiment of the invention. The object designer first provides detailed attribution information 432 (step 516), which is stored in the database entry 428 in the database 424 (see FIG. 14). The object designer then selects and moves an initial media element from the gallery 66 to create an object 18 (step 520). The object designer then opens the settings palette 82, if not already open (step 524), and then selects the attribution icon 272 (FIG. 8) for the attribution behavior 400 and moves it to the settings tray 100 (step 528). In one embodiment the icon for the attribution behavior 400 is moved from the additional behaviors palette 58 (FIG. 6). Alternatively, the attribution icon 272 is moved from an actions behavior palette 116 (FIG. 8). The object designer then enters summary attribution information 416 into attribution data fields provided in the settings palette 82 (step 532). In one embodiment, additional summary information may be entered in a separate identification behavior, such as represented by the ID/Credit icon 276 in FIG. 10.

Figure 16:
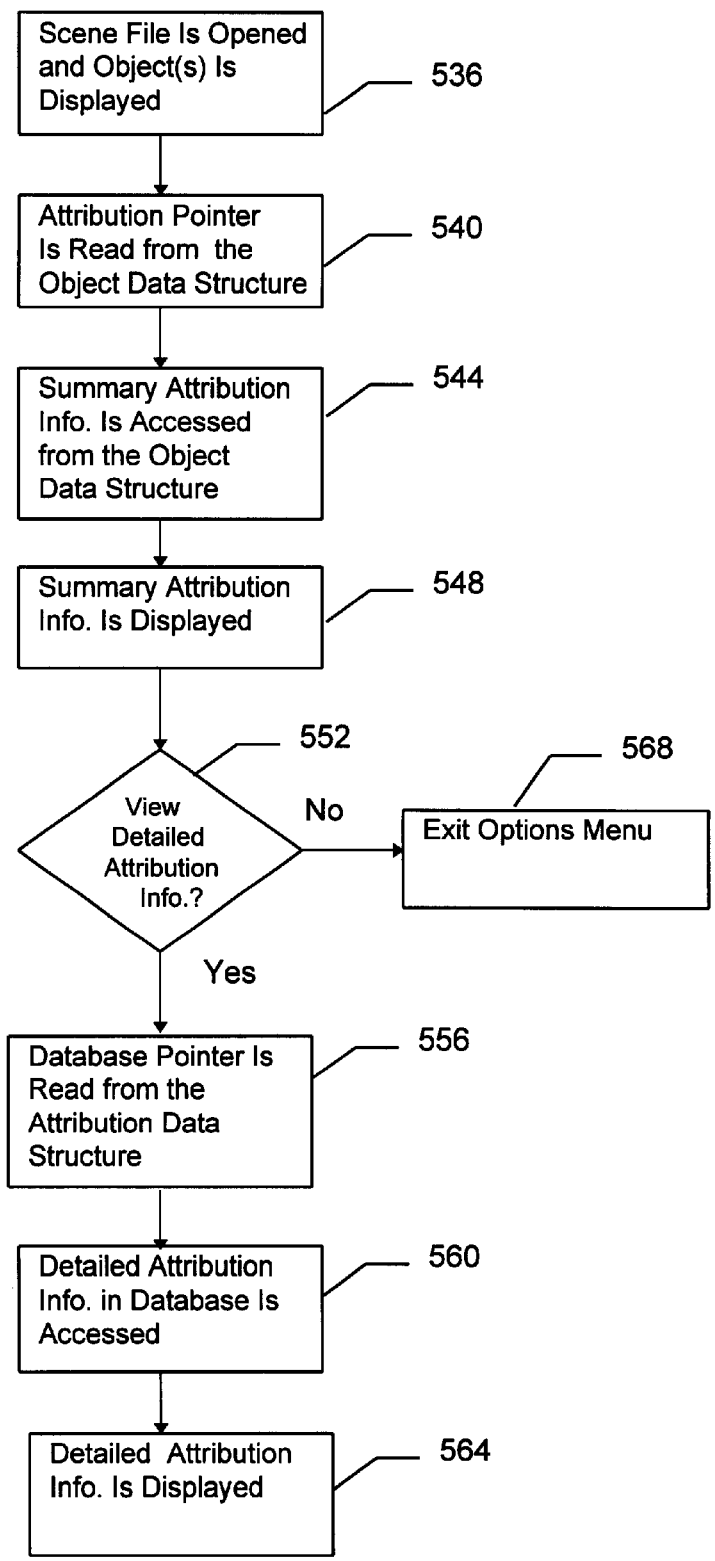
FIG. 16 is a flowchart of an embodiment of a process of accessing and displaying attribution information.

FIG. 16 summarizes the process of accessing and displaying attribution information. When an end user requests that a scene file be displayed, the object maker software opens the scene file and displays one or more objects 18 included in the scene file (step 536). In one embodiment, the name of the scene file is displayed in the scene header 104 of the scene window 54. Alternatively, an end user may view an object 18 that is being displayed from a remote location over the Web. In this case, the object maker software at the remote location has opened a scene file for that object 18 at the remote location. The object maker software displays each object 18 in a default object state 30 and displays the subcomponents 820' included in the default object state list 804. When the end user requests the summary attribution information 416, then the object maker software directs the processor 14 to access the object data structure 20 to read the attribution pointer 408 (step 540). In one embodiment, the end user presses the right mouse button to bring up a pop-up menu from which the end-user selects a summary attribution or copyright information option. The processor 14 then uses the attribution pointer 408 to access the summary attribution information 416 stored in the attribution data structure 412 (step 544).

The summary attribution information 416 is then displayed to the end user (step 548). The end user can then decide whether to view more detailed attribution information 432 or not (step 552). If yes, the end user selects for the more detailed attribution information 432. The processor 14 reads the database pointer 420 from the attribution data structure 412 (step 556). The processor 14 uses the database pointer 420 to locate the detailed attribution information 432 in the database 424 (step 560). The detailed attribution information 432 is then displayed to the end user (step 564).

If the end user does not decide to view the detailed attribution information 432 (step 552), then the options menu is closed or another option can be selected (step 568).

The object maker embodiment of the invention provides a copyright feature that represents one embodiment of the attribution feature. The major components associated with the copyright feature include the object maker, the object viewer, and the object site on the World Wide Web. One example of an object Web site is the ThingWorld™ Web site from ThingWorld.com. The object designer uses the object maker to create interactive objects 18 using digital media imported into the application. A copyright component is then attached to the object 18. This component contains basic copyright information and a link to a biographical page on the object Web site, also termed a "bio page". The basic copyright information is an embodiment of the summary attribution information 416. The biographical page is an embodiment of the detailed attribution information 432. The completed object 18 can be viewed in other applications using the object viewer. During playback, the copyright information can be accessed, and provides a link back to the biographical page on the object Web site.

To design an object 18 with the copyright feature, the object designer first registers with the object Web site and supplies biographical information to create the bio page (step 516 in FIG. 15). All registered owners of object maker who create a bio page are supplied with an object maker ID, which is entered into the copyright component and is used to authenticate the link to the bio page on the object Web site. The object designer then must create an object 18, assign a copyright behavior to it, and enter the summary copyright and attribution information 416 in the copyright property sheet 448 (as discussed below). The object designer enters detailed attribution information 432 in the object maker ID.

The object maker ID includes two parts: (1) a registration ID file that allows access to the object maker and permits the object designer to download credit information which easily can be attached to the objects 18; and (2) a bio page or displayed ID page put up on the object maker Web site that links everything made by the object designer to this page. The registration data is confidential. The displayed ID page is dynamic. It is the place where visitors to the object Web site can find out more about the object designer and her work. The displayed ID page can be thought of as an electronic business card, one that can be continually be updated. The object maker ID is part of the detailed attribution information 432, although only the displayed ID page is displayed to the end user.

The object maker ID may be acquired at the object Web site in a directory section. The object designer must register with the object Web site by filing out a registration form. The first step, when registering, is to decide whether the displayed ID page is being created for an individual or for an organization. This choice not only determines what information it is necessary to provide; more importantly, it also determines how the page will be classified on the site itself. The object designer also provides a password that is later used to confirm the object designer's identity when creating or modifying a displayed ID page and when loading a registration ID file into the object maker. The server computer at the object Web site creates a registration ID file from the information provided by the object designer. The registration ID file is stored on any suitable storage medium for storing digital data processing data and files. Such a storage medium can include, but is not limited to, 3½ inch disks, CD-ROM disks, hard disks, data tapes, writeable ROM devices, and other suitable storage media known and used with digital data processing computers.

After the designer has filled out the registration form, the designer is prompted to download to her local computer the registration ID file. This file is loaded into the version of object maker running on the local computer and contains the summary attribution data 416 which is automatically embedded into every object 18 published by the designer. Once this ID file is obtained, it can be used in the copyright and ID action behaviors. In turn, the object viewer uses this information to link to the designer's displayed ID page located at the object Web site. The also can be used to add a locking action behavior 600 to an object 18. Once this lock has been added, no one else can unlock the object 18, unless the object designer gives them a copy of the registration ID file and the password for that file.

The basic information needed to receive an ID file includes name, password, occupation, URL, fax, and address. Some of this information is optional. This registration information is placed in the registration ID file. It is not the same information that the designer will publish on his object site ID page, although she may wish to incorporate some of it. The object Web site keeps this information on file as part of a database, but any registration information put into these fields may be kept confidential.

The object Web site also sends a validation number by electronic mail to the object designer. Validation ensures that the person who creates the page has a valid e-mail address. The validation number is needed to complete the registration process. Until a page is validated, it will not be available or "live" on the object Web site.

Once the information for a registration ID file has been entered, the object Web site allows the object designer to download the file into the registration ID files directory of the object maker directory.

The object designer then composes a displayed ID page. If the designer represents a company or organization, she can upload a logo file. Individuals can choose from a set of standard images to represent their page at the object Web site. Here, the designer can choose the information to display on the ID page.

Once the designer had finished editing his displayed ID page, the object Web site requires validation of the page before it becomes available on the Web. The designer can validate the page immediately or put it on hold; but it will not be available at the object Web site until it is validated. The object designer uses the validation number that was e-mailed to the designer. The designer enters the name, password, and validation number to confirm the designer's identity. The displayed ID page is validated.

After creating a displayed ID page and downloading the registration ID file, the designer must load the registration ID file into the object maker, before using the lock, copyright and ID/credit action behaviors.

To load the registration ID file, the object designer uses the IDs menu option under the File menu on the menu bar 105 (see FIG. 8). The designer chooses the add registration ID file option. Then the designer enters the password used when creating the object maker ID. Without this password, the program will not recognize the ID. After adding the ID file to object maker, the designer can use the new ID in the lock, copyright and ID action behaviors.

The object web site server encrypts each registration ID file. In one embodiment, this encryption is done using the Microsoft™ CryptoAPI (Cryptographic application programming interface). As is known in the art, this encryption can be done by other commonly used and known APIs used for the purpose of encrypting software data and/or files. In one embodiment, the registration ID file includes an encrypted database record key that identifies the database record for the displayed ID page. In order for the displayed ID page to be modified, the database record key is passed from a local registration ID file to the server for the object Web site. The server decrypts the database record key in order to access the appropriate database record in the server's database for the ID page associated with the registration ID file. In one embodiment, the server uses two levels of verification before allowing modification of an ID page.

In one embodiment, the security for the registration ID file is dependent on the object designer keeping others from gaining copies of this file and access to her password. If another person has a copy of the registration ID file and the password, then she could load the file into her version of the object maker and enter the password when asked to do so in the loading process. Then, she could use the registration ID file in the attribution 400 and locking 600 behaviors to change the attribution information or the locking for an object 18.

Figure 17:
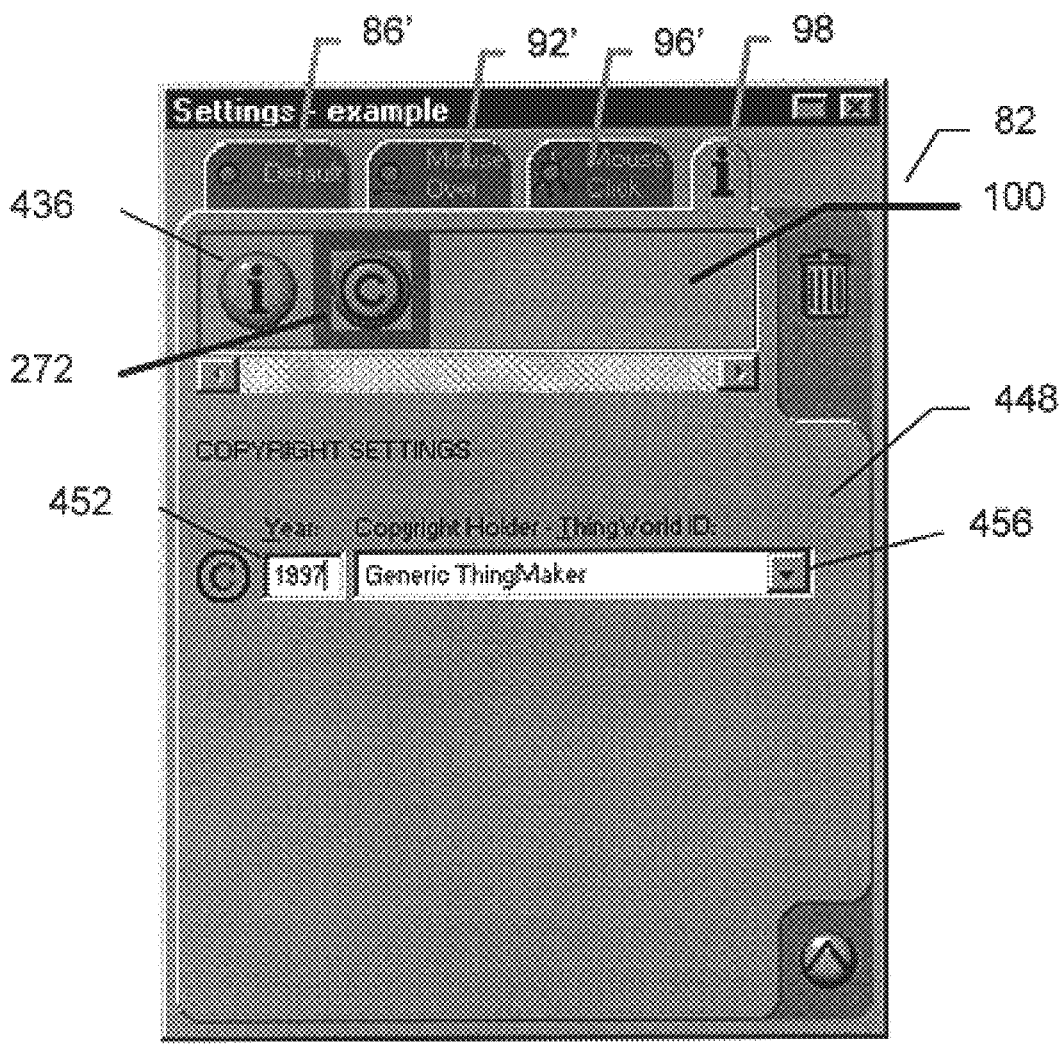
FIG. 17 shows an embodiment of a copyright settings sheet for an embodiment of a graphic user interface for one embodiment of the invention.

FIG. 17 shows the copyright settings sheet 448 for the object maker embodiment of the invention. FIG. 17 shows the settings palette 82, default object state tab 86', MouseOver object state tab 92', MouseClick object state tab 96', Information Tab 98, and the settings tray 100 with icons for a Information Settings icon 436, and copyright (attribution) action 272. FIG. 17 also shows the copyright settings sheet 448, the copyright date fields 452, and identification field 456.

To create an object 18 using object maker, the designer first creates an object 18 on the scene window 54 (step 520 in FIG. 15). The object designer adds the copyright component to an object by dragging the copyright action icon 272 from the Action palette 116 (FIG. 8) to the Information Tab 98 of the setting sheet 82 for the object 18 (step 528) The object maker automatically displays the copyright settings sheet 448 in the lower half of the settings palette 82. The object designer uses the copyright settings sheet 448 to enter copyright information into the copyright component (step 532). The copyright date field 452 contains the copyright date, and the identification field 456 contains the name of the copyright holder. The identification field 456 contains the identification number of the copyright holder and the object maker ID. The copyright information entered onto the copyright property sheet 448 represents one embodiment of summary attribution information 416.

The objects 18 are primarily designed for distribution and viewing on the World Wide Web, and the object viewer application provides a method of viewing the objects 18, as well as accessing the copyright information attached to each object 18. Typically, an end user will view the object 18 using the object viewer.

The end user accesses a Web page that contains an object maker file. This launches the object viewer application, which displays the objects 18 contained in that file (step 536 in FIG. 16). The end user can right-mouse click any object 18 to display a menu of options for the object 18. One of these is the copyright item. Selecting the copyright item displays a dialog window with the copyright date, copyright holder name, and a list of credits for others who have contributed to the design of the object 18, if any (step 548 in FIG. 16). The object designer must have provided this list of credits previously in the identification behavior (ID/Credit icon 276). The end user can click separate buttons in the dialog which link to the copyright holder on the object Web site. Before linking, the ID number is passed to the object Web site server. If the ID number is not the correct one for the displayed ID page, the object viewer does not link to the page; this mechanism prevents others from forging objects 18 and linking them to another author's page.

Locking

Figure 18:
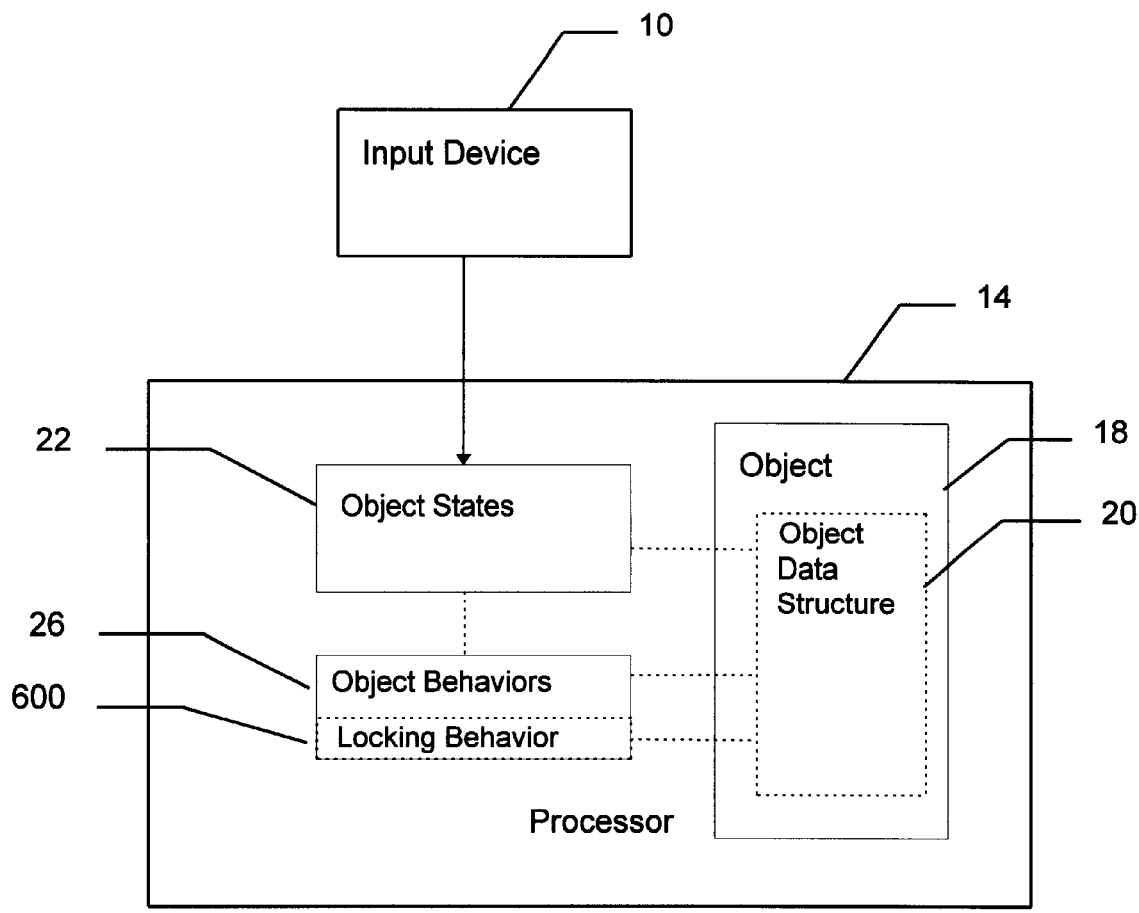
FIG. 18 shows a high level functional block diagram of an embodiment of a locking behavior for an embodiment of the invention.

In one aspect of the invention, the object behaviors 26 include a locking feature. FIG. 18 shows the locking features as a locking behavior 600 in a high level functional block diagram of one view of the invention. FIG. 18 also shows an input device 10, a processor 14, an object 18, object data structure 20, object states 22, and object behaviors 26, which have been discussed previously.

The locking behavior 600 allows an object designer to prevent an end user modifying one or more aspects of the object 18. In one embodiment, an aspect of an object 18 is an object behavior 26 associated with an object state 22. Thus, if an Web link behavior 224 is associated with an activation object state 38, then the object designer can selectively lock the Web link behavior 224 so that an end user cannot modify it but could allow the end use to modify the object 18 in other ways. The end user can only modify an unlocked object 18 if the end user is running the object maker on her local computer. If the end user is running the object viewer, she cannot modify an object even if unlocked.

Figure 19:
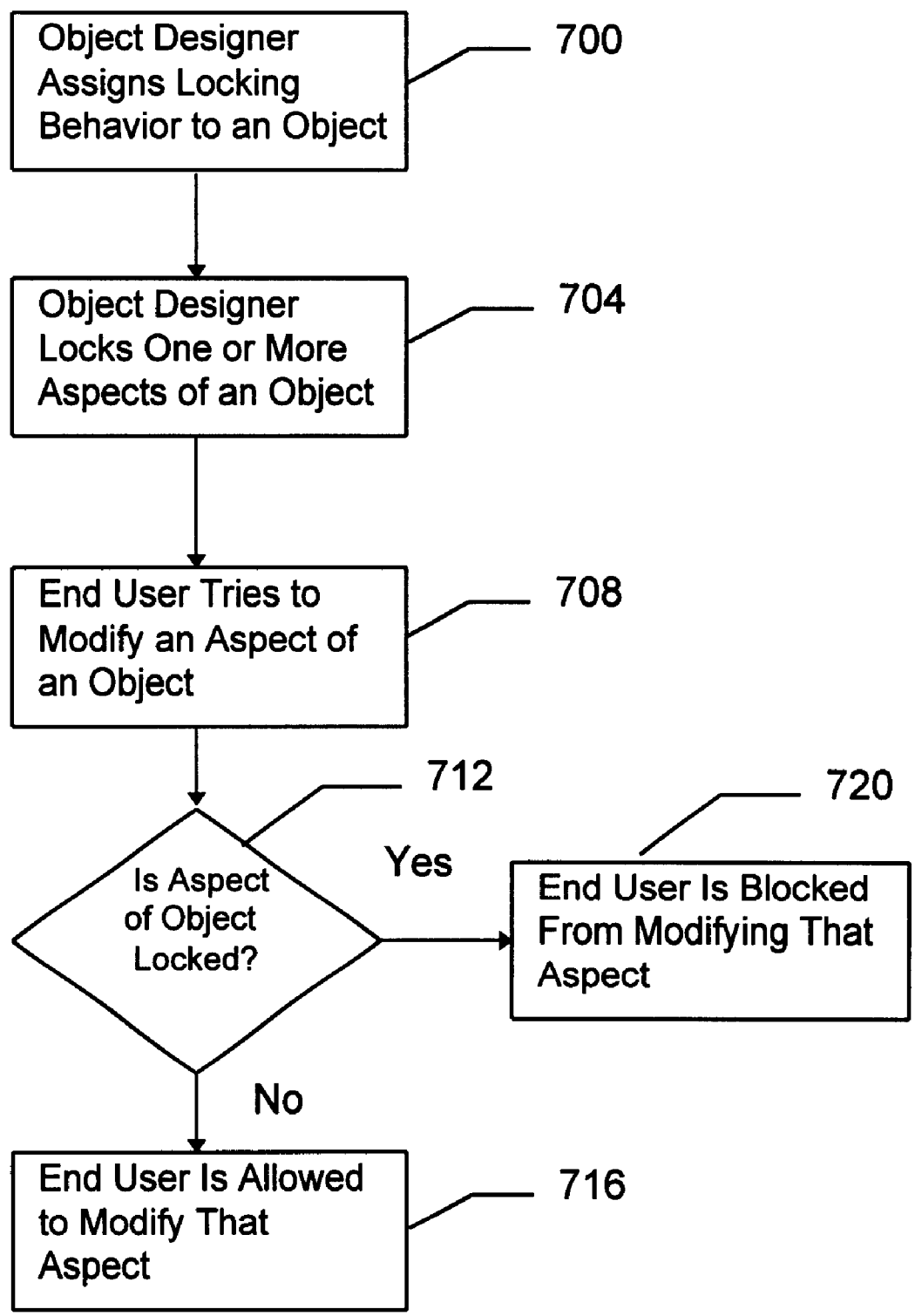
FIG. 19 shows a high level flow chart of an embodiment of the process of locking an aspect of an object for the embodiment shown in FIG. 18.

FIG. 19 shows a high level flow chart of the process of locking an aspect of an object 18. First an object designer assigns the locking behavior 600 to an object 18 (step 700). The object designer then locks one or more aspects of an object 18 (step 704) and makes the object 18 available to end users. Once the object is available, the end user may try to modify aspects of the object 18 (step 708). First, it is must be determined whether a particular aspect that the end user wants to modify is locked (step 712). If that aspect is locked, then the end user is blocked from modifying it (step 720). If not, then the end user can modify that aspect of the object 18 (716).

In a further embodiment of the invention, the object 18 records any modifications made by an end-user.

Typically, the locking behavior 600 is an action behavior 42, although it may also be treated as a complex behavior 50. In one embodiment, the locking behavior 600 is typically assigned to the Information Tab 98. In a particular embodiment, the locking information 600 is treated as a property of the object 18, although, in practice, the user assigns it to an object 18 as though it were an object behavior 18.

Figure 20:
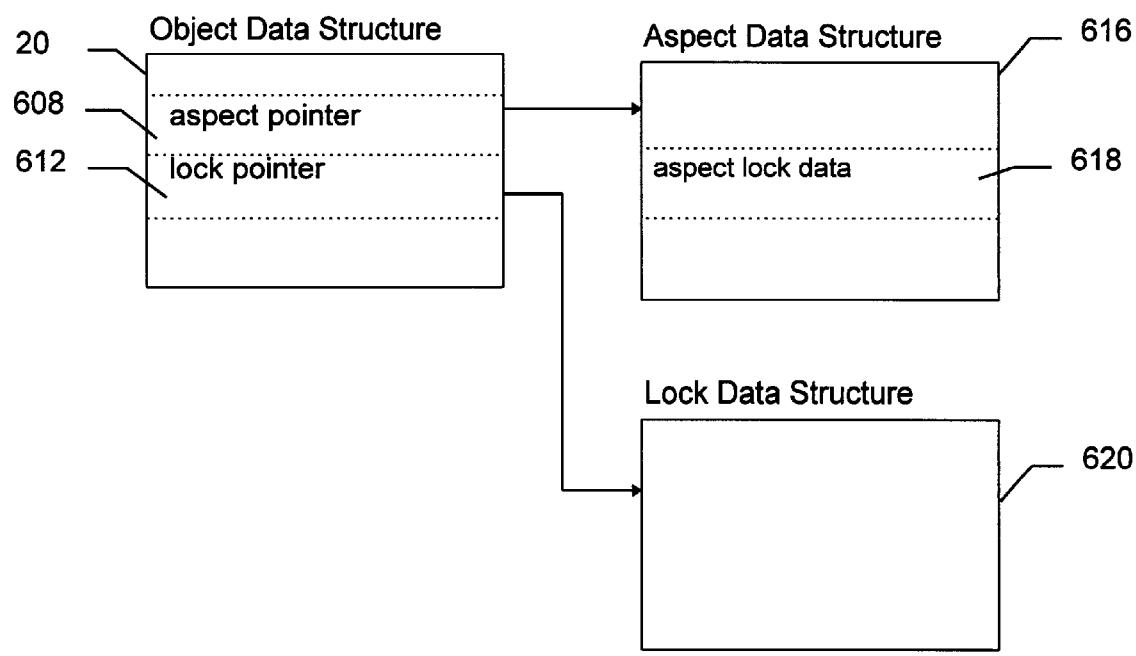
FIG. 20 is a block diagram showing an embodiment of the data structures associated with locking for one embodiment of the invention.

FIG. 20 is a block diagram showing the data structures associated with locking for one embodiment of the invention. FIG. 20 shows the object data structure 20, an aspect pointer 608, the aspect data structure 616, the lock pointer 612, and the lock data structure 620. The aspect pointer 608 links the object data structure 20 to the aspect data structure 616, which includes the aspect lock data 618 and data related to that aspect of the object 18. The lock pointer 612 links the object data structure 20 to the lock data structure 620, which contains data related to locking. The aspect lock data 618 indicates whether that aspect is locked and at what level of locking. The locking level indicates whether the object 18 is locked or not, and, if locked, whether to allow copying or changing an object 18. In one embodiment, the locking level can also explicitly include deleting the object 18 or aspect of an object 18. When the lock data structure 620 is created, a lock controller checks the aspect lock data 618 and prevents active access to the aspect data structure 616. Active access by a user includes deleting, copying, and/or modifying the aspect data structure 616. The user may be allowed passive access, such as viewing that aspect of an object 18, which provides access to the data in the aspect data structure 616 without any modification. In one embodiment, the lock controller prevents active access when the object designer creates the lock data structure 620 when locking an aspect of an object 18.

Figure 21:
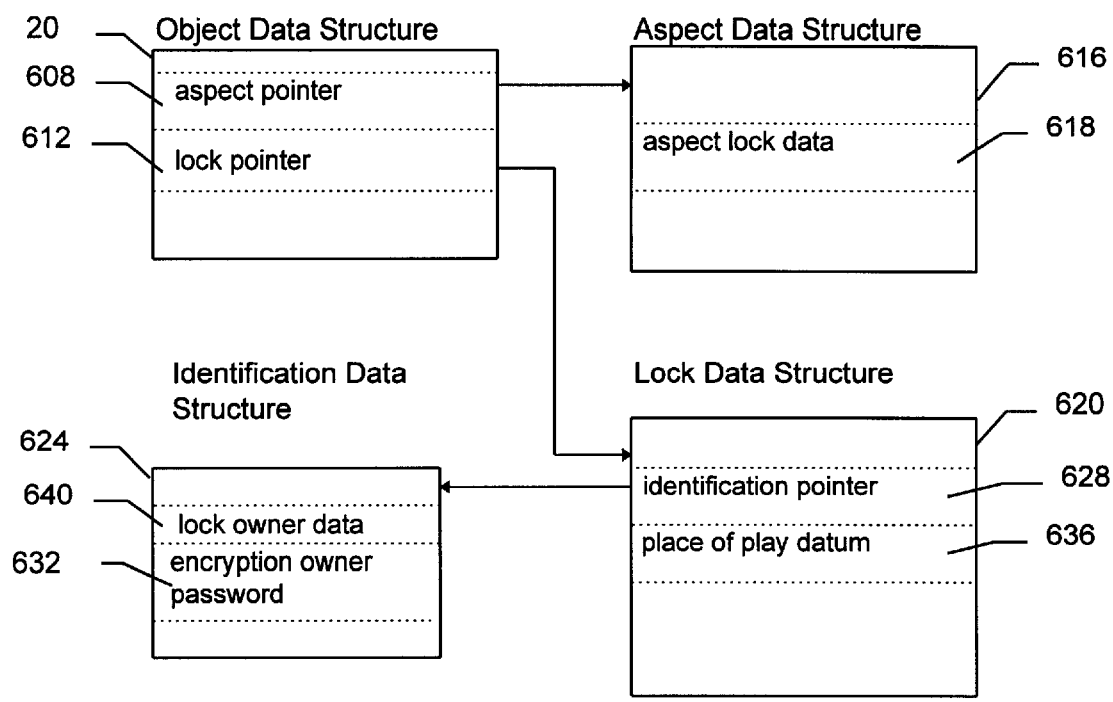
FIG. 21 shows a further embodiment of the data structures referred to in FIG. 20, further including an identification data structure.

FIG. 21 shows a further embodiment of the data structures referred to in FIG. 20 further including an identification data structure 624. FIG. 21 includes the object data structure 20, the aspect data structure 616, the lock data structure 620, and the identification data structure 624. The lock data structure 620 includes an identification pointer 628, and a place of play datum 636. The identification data structure 624 includes an encryption owner password 632 and lock owner data 640. The identification pointer 628 links the lock data structure 620 to the identification data structure 624. The lock owner data 640 provides information on the person who locked the object 18. The encryption owner password 632 is a password for the lock owner, which the lock controller compares to a password provided by an end user who is trying to unlock or gain active access to the object 18. If the two passwords do not match, then the user is blocked from active access to the object 18. The place of play datum 636 includes information on where the object 18 is allowed to function, such as a particular Web site or list of Web sites on the Internet. The lock controller determines the location where an object 18 is to be displayed and will prevent the object 18 from being used there if the location of display does not match the place of play datum 636.

In one embodiment, the locking is implemented in a component base class from which objects 18 and behaviors 26 inherit. Locking is enforced throughout the application in the software modules. For example, the settings module checks the locking flags and data in the lock data structure 620 and aspect data structure 616 to determine whether an aspect (or object behavior 26) can be added to an object 18, when an object designer moves the icon for the object behavior 26 to the settings tray 100. If the settings module determines that the object 18 is locked and is not allowed to be modified, then the settings module does not allow the object behavior 26 to be added as a subcomponent 820 to the object data structure 20 (see FIG. 4).

Some of the locking features are also implemented in the object 18 itself. A base drop zone class provides a base class that helps determine whether an object 18 can be dropped in a particular area or "drop zone" of a scene. The object 18 inherits from the base drop zone class, which provides drag and drop methods. For example, when the icon for an object 18 is moved across the scene window 54, one object method inherited from the drop zone class checks to determine whether locations on the display screen are valid drop "zones." This method checks the locking data structure 620 to determine whether the object 18 is allowed to be dropped into certain locations that may result in a modification to the object 18.

Figure 22:
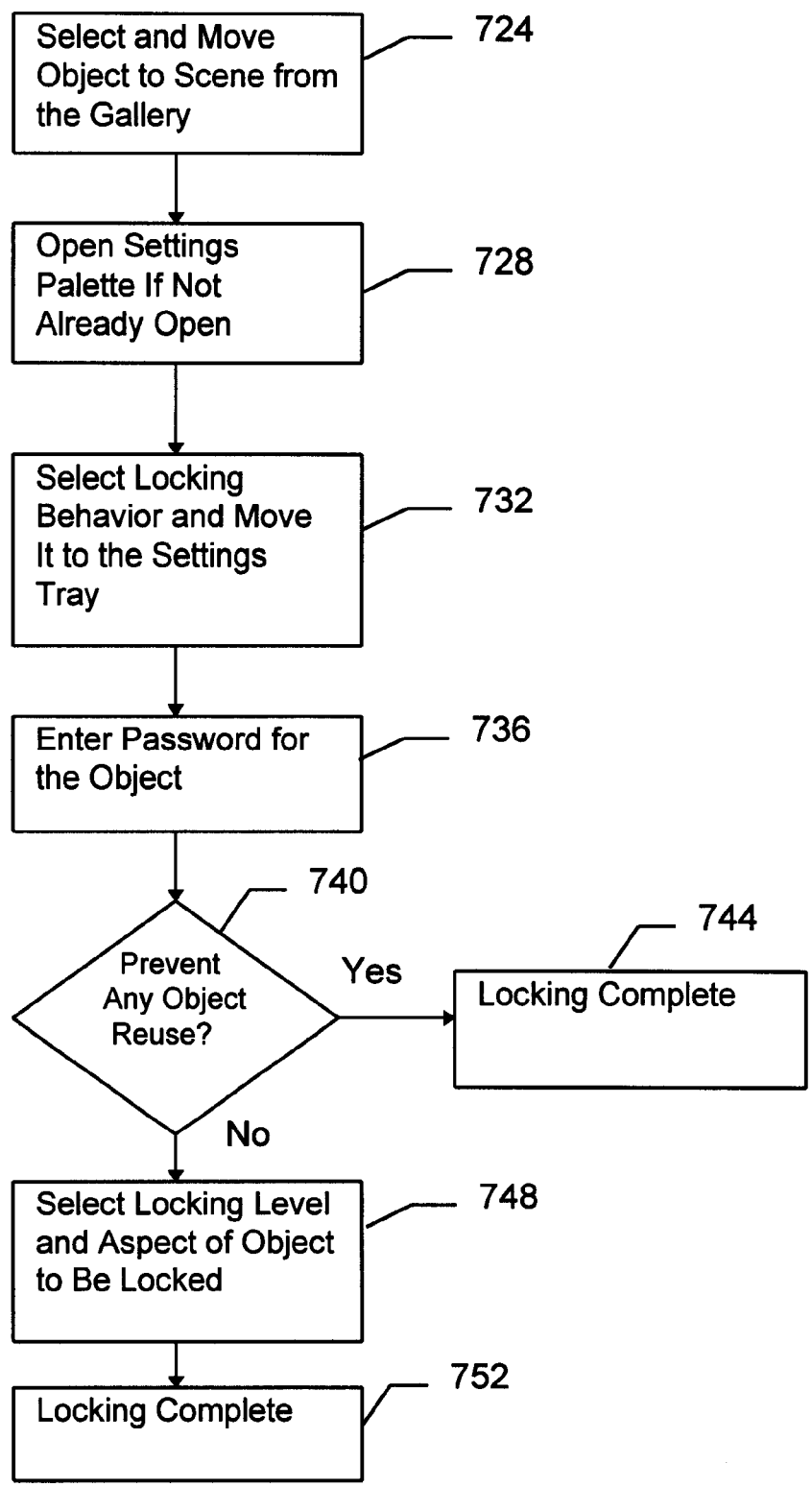
FIG. 22 shows an embodiment of the process of locking an aspect of an object, according to one embodiment of the invention.

FIG. 22 shows the process of locking an aspect of an object 18, according to one embodiment of the invention. The object designer first creates an object 18 by selecting and moving an initial media element to the scene window 54 or moves an existing object 18 to the scene window 54 (step 724). The object designer opens the settings palette 82, if it is not already open (step 728), and then selects the locking behavior 600 by selecting the locking icon 268 and moving it to the settings tray 100 (step 732). The object designer then enters the password in order to set or change the locking on it (step 736). In one embodiment of the invention, the object designer enters her registration identification or ID file, which includes the identification data structure 624, which includes the encryption owner password 632. In a further embodiment, the object designer enters a password that must match the encryption owner password 632 when loading the registration identification or ID file into the object designer's locally running version of the object maker. After doing this, the object designer can then lock objects 18 she is designing with her version of the object maker. The object designer can determine to prevent all reuse of the object 18, in which case the locking is complete (steps 740 and 744). Alternatively, the object designer can determine to lock specific aspects of an object 18 and the locking level for each aspect (step 748), after which the locking of the object 18 is complete (step 752).

The object maker embodiment of the invention includes the locking feature. To use the locking feature, a locking behavior 600 is attached to the object 18. The object designer then selects what aspects of the object 18 to lock and the level of locking.

Figure 23:
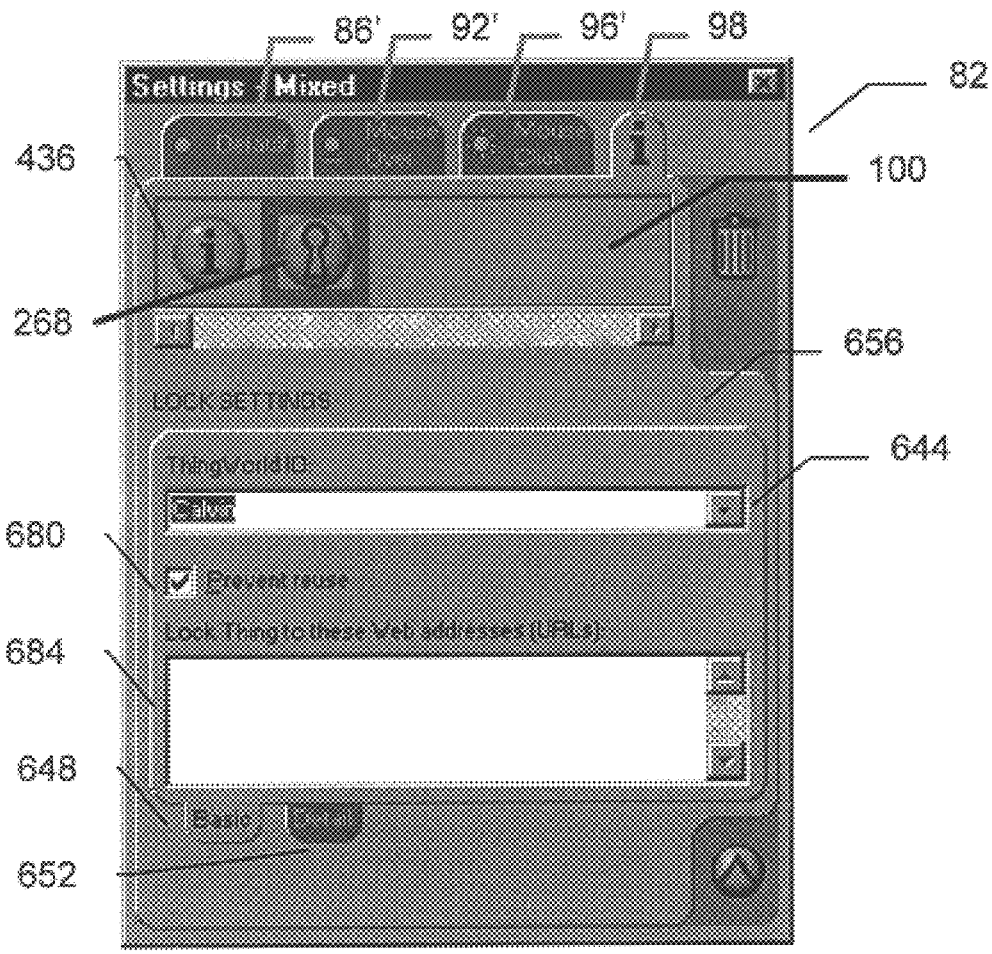
FIG. 23 shows an embodiment of a basic lock setting sheet as displayed in a settings palette for an embodiment of a graphic user interface for one embodiment of the invention.
Figure 24:
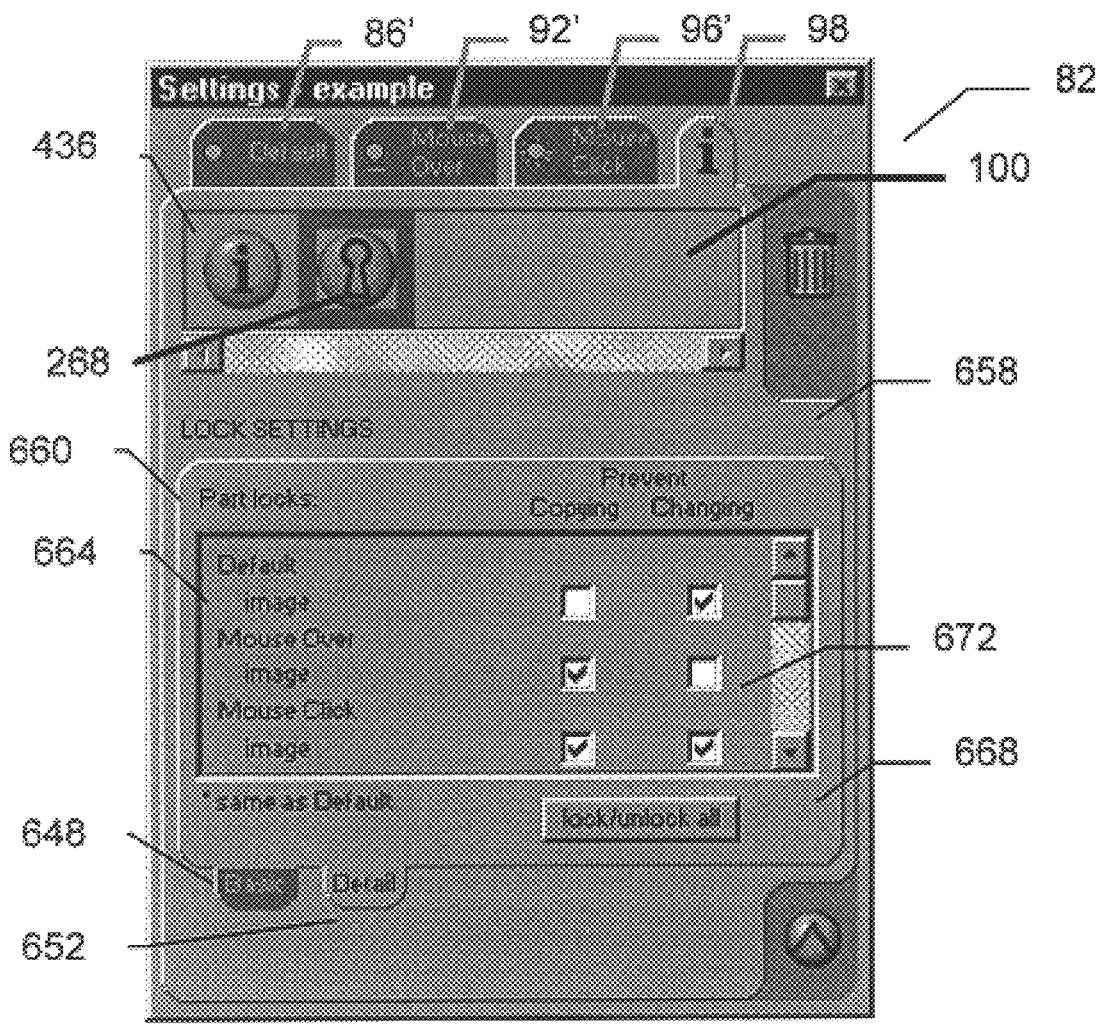
FIG. 24 shows a detailed lock settings sheet for the embodiment of the invention shown in FIG. 23.

FIG. 23 shows the basic lock settings sheet 656 as displayed in a settings palette 82 for one embodiment of the invention. FIG. 23 also shows the Default object state tab 86', MouseOver object state tab 92', MouseClick object state tab 96', the Information tab 98, the settings tray 100 with Information Settings icon 436 and Lock action icon 268. The basic lock settings sheet 656 includes an ID data field 644 for entering an object maker ID identifying the owner of the object and the lock. In one embodiment of the invention, the object maker ID corresponds to the identification data structure 624, which may be stored in an object maker ID registration file. The basic lock setting sheet 656 includes options to "Prevent reuse" 680, and "Lock to these Web Addresses (URL)" 684. The basic lock settings sheet 656 is displayed if the object designer selects the Basic lock settings tab 648. The detail lock settings sheet 658 (see FIG. 24) is displayed if the object designer selects the Detail lock settings tab 652.

The detail lock setting sheet 658 has a Part Locks section 660. The Part Locks section 660 shows the parts box 664 which shows the different parts or aspects of the object 18 that can be copied, modified or locked, and the checkoff boxes 672, which show which parts or aspects have been locked. The detail lock setting sheet 658 also contains the lock settings button 668 which include a button for "lock/unlock all". In one embodiment, the checkoff boxes 672 indicate the locking level in effect for the aspects of the object 18, and this information is stored in the aspect lock data 618 in the aspect data structure 616 (see FIG. 21).

To set locking, the object designer must first add any other object behaviors 26 to the object 18. Locking should be done last. The object designer selects the default object state 30 by selecting the Default object state tab 86' and then drags the lock action icon 268 to the settings tray 100. In one embodiment, the lock action icon 268 can only be assigned to the Information Tab 98.. A password screen appears, and the object designer must enter the password for the object 18. The designer now can set the locking options.

To prevent others from reusing the object 18 in any way, the object designer chooses either "Prevent object reuse" 680, or "Lock to these Web Addresses 684. The "Lock to these Web Addresses" 684 option provides maximum protection. Even if end users manages to get a copy of the object 18 they will not be able to reuse it. However, this can make working with the object 18 more difficult because changing the location of the object 18 on the Web requires opening and editing the detail lock settings sheet 658.

The object designer can lock the individual parts or aspects of an object 18. The object designer clicks in the individual copy or change options in the checkoff boxes 672 to set these options for individual parts of the object 18. A check mark means the lock is on for the selected feature. For example, if copy is checked, then an end-user cannot copy that aspect of the object 18. The object designer can scroll down to see all the checked off locks for the object 18.

If the "Prevent reuse" option 680 is selected, all other settings are automatically selected. After completing the lock settings, the object designer saves the object 18. The object 18 is now ready for distribution to end users who may use those aspects of the object 18 that have not been locked.

Having described the preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. An apparatus for selectively locking an aspect of an interactive media object, said apparatus comprising:
   a processor;
   a lock controller; and
   a memory in communication with said processor, said memory comprising:
      an aspect data structure associated with said aspect of said object;
      a lock data structure associated with said object; and
      an object data structure associated with said object, said object data structure comprising an aspect pointer linking said aspect data structure to said object data structure, and a lock pointer linking said lock data structure to said object data structure,
   wherein said lock controller prevents an end user from active access to said aspect data structure in response to creation of said lock data structure.

2. The apparatus of claim 1, wherein said active access to said aspect data structure comprises alteration of said aspect data structure.

3. The apparatus of claim 1, said memory further comprising an identification data structure comprising lock owner data related to said lock data structure, wherein said lock data structure comprises an identification pointer to said identification data structure.

4. The apparatus of claim 3, wherein said identification data structure comprises an encryption owner password, wherein said lock controller permits active access to said aspect data structure in response to a comparison of said encryption owner password with a password from said user.

5. The apparatus of claim 3, wherein said apparatus comprises a storage medium and said identification data structure is stored in an identification registration file on said storage medium.

6. The apparatus of claim 1, wherein said lock data structure comprises a place of play datum, said processor determines a location of display of said object, and said lock controller prevents active access to said aspect data structure if said location of display and said place of play datum are not substantially identical.

7. The apparatus of claim 1, said aspect data structure further comprising aspect lock data specifying a locking level for said aspect.

8. A method for selectively locking an aspect of an interactive media object, comprising the steps of:
   creating an object data structure associated with said object and comprising an aspect pointer and a lock pointer;
   creating aspect data structure associated with said aspect of said object;
   creating a lock data structure associated with said object; and
   preventing an end user from active access to said aspect data structure in response to creating said lock data structure,
   wherein said aspect pointer links said aspect data structure to said object data structure, and
   wherein said lock pointer links said lock data structure to said object data structure.

9. The method of claim 8 wherein said active access to said aspect data structure comprises alteration of said aspect data structure.

10. The method of claim 8 further comprising the step of creating an identification data structure comprising lock owner data related to said lock data structure, said lock data structure comprising an identification pointer to said identification data structure.

11. The method of claim 10 wherein said identification data structure further comprises an encryption owner password and said method further comprises the steps of:
   requesting a password from a user;
   comparing said password from said user to said encryption owner password; and permitting active access to said aspect data structure if said password from said user corresponds to said encryption owner password.

12. The method of claim 8 further comprising the steps of:

determining a location of display of said object; and preventing active access to said aspect data structure if said location of display is not substantially identical to a place of play datum in said lock data structure.

* * * * *